(12) United States Patent
Nagahama et al.

(10) Patent No.: US 9,787,826 B2
(45) Date of Patent: Oct. 10, 2017

(54) MONITORING APPARATUS TO MONITOR COMMUNICATION AMONG TERMINAL DEVICES INSIDE GROUP, AND STORAGE MEDIUM

(71) Applicant: JVC KENWOOD Corporation, Yokohama-shi, Kanagawa (JP)

(72) Inventors: Tomonori Nagahama, Yokohama (JP); Ichiro Shishido, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 15/220,506

(22) Filed: Jul. 27, 2016

(65) Prior Publication Data

US 2017/0034341 A1    Feb. 2, 2017

(30) Foreign Application Priority Data

Jul. 29, 2015  (JP) .................................. 2015-149757
Jul. 29, 2015  (JP) .................................. 2015-149759

(51) Int. Cl.
| | | |
|---|---|---|
| *H04M 3/12* | (2006.01) | |
| *H04L 29/08* | (2006.01) | |
| *H04W 4/08* | (2009.01) | |
| *H04W 72/00* | (2009.01) | |
| *H04W 88/08* | (2009.01) | |
| *H04W 88/02* | (2009.01) | |

(52) U.S. Cl.
CPC .............. *H04M 3/12* (2013.01); *H04L 67/00* (2013.01); *H04W 4/08* (2013.01); *H04W 72/005* (2013.01); *H04W 88/02* (2013.01); *H04W 88/08* (2013.01)

(58) Field of Classification Search
CPC ..... H04W 4/08; H04W 72/005; H04W 88/02; H04W 88/08; H04W 72/121; H04L 67/00; H04M 3/12
See application file for complete search history.

(56) References Cited

FOREIGN PATENT DOCUMENTS

JP    2005-018375 A    1/2005

*Primary Examiner* — Nathan Mitchell
*Assistant Examiner* — Ernest Tacsik
(74) *Attorney, Agent, or Firm* — Claire Zopf

(57) ABSTRACT

A plurality of groups including a plurality of terminal devices are formed, and further, each of a plurality of base station apparatuses assigns a channel in a unit of the group such that communication is performed from one of the terminal devices included in a group to which the channel is assigned to the other terminal devices included in the group, and a receiver receives information on a busy count generated in the group registered in each of the base station apparatuses. A display unit displays information indicating the busy count for each of the base station apparatuses based on the received information.

14 Claims, 14 Drawing Sheets

|   | | Group 1 | Group 2 | Group 3 | Group N | TOTAL BUSY COUNT |
|---|---|---|---|---|---|---|
| FIG.4A | FIRST BASE STATION APPARATUS | 3 | 0 | ... | ... | 10 |
| FIG.4B | SECOND BASE STATION APPARATUS | 5 | 2 | ... | ... | 17 |
| FIG.4C | THIRD BASE STATION APPARATUS | 3 | 1 | ... | ... | 5 |
| FIG.4D | FOURTH BASE STATION APPARATUS | 0 | 0 | ... | ... | 0 |

FIG.5

|  | ACQUISITION TIME | GROUP REGISTRATION ELEMENT | REGISTERED GROUP BUSY GENERATION COUNT |
|---|---|---|---|
| FIRST BASE STATION APPARATUS | 12:00 | {1, 7, 8, 20, 201} | {1, 1, 0, 0, 1} |
|  | 12:30 | {1, 2, 7, 8, 20, 201} | {1, 2, 0, 0, 1, 2} |
|  | ... | ... | ... |
| SECOND BASE STATION APPARATUS | 12:00 | {1, 7, 8, 20, 201} | {1, 1, 1, 1, 1} |
|  | 12:30 | {1, 2, 7, 8, 20} | {2, 0, 1, 1, 0} |
|  | ... | ... | ... |

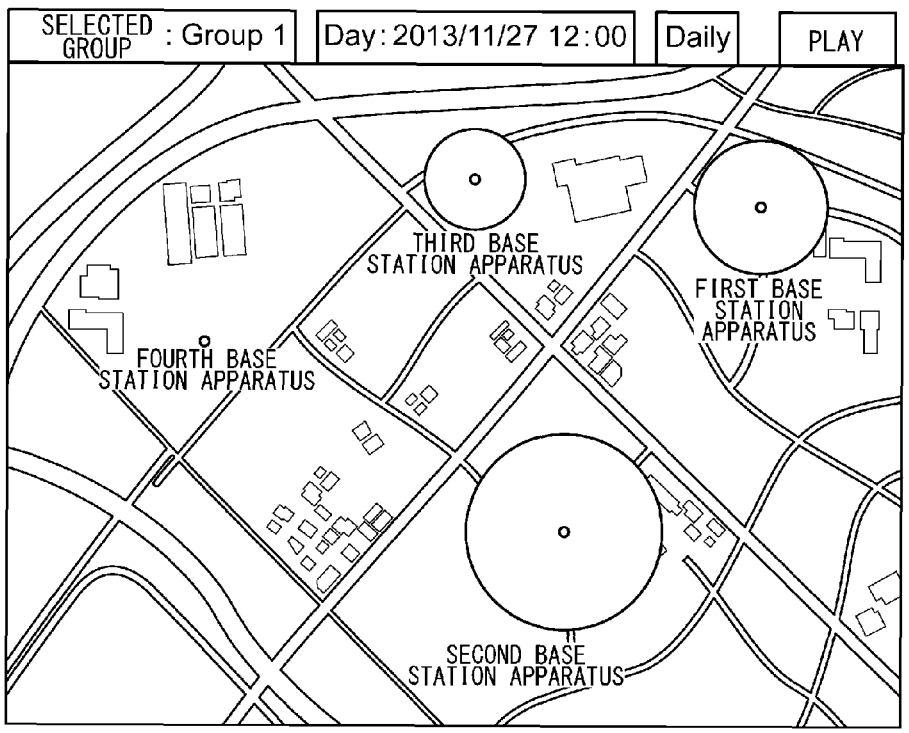
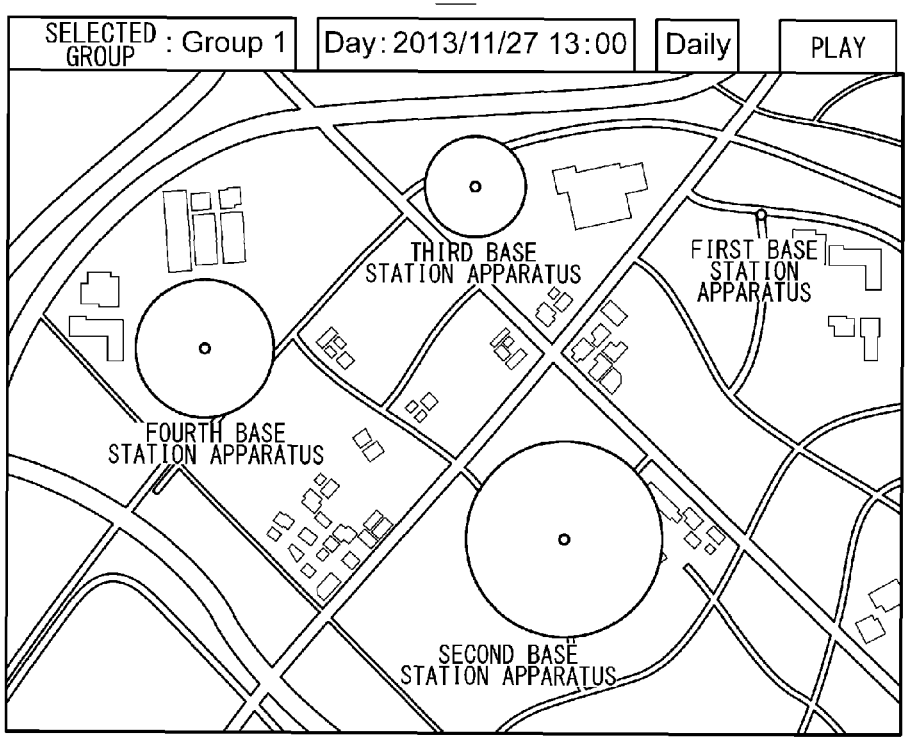

MONITORING APPARATUS TO MONITOR COMMUNICATION AMONG TERMINAL DEVICES INSIDE GROUP, AND STORAGE MEDIUM

CROSS-REFERENCE TO RELATED APPLICATION

This application is based upon and claims the benefit of priority from the prior Japanese Patent Application No. 2015-149757, filed on Jul. 29, 2015 and Japanese Patent Application No. 2015-149759, filed on Jul. 29, 2015, the entire contents of which are incorporated herein by reference.

BACKGROUND

1. Field

The present invention relates to a monitoring technique, and particularly to a monitoring apparatus to monitor communication among terminal devices inside a group, and a storage medium.

2. Description of the Related Art

Information of mobile terminals in a specific range is collected by a base station apparatus, and is stored in a location information database in order to facilitate investigation of the amount of flow of passersby or cars in a specific region. Such information is analyzed by a movement information subsystem in time series manner such that the amount of movement of distribution of mobile phone terminals and the like, a congestion state of calls, and the like are displayed on a map (for example, Patent Literature 1).

CITATION LIST

Patent Literature

[Patent Document 1] Japanese Patent Application Laid-open No. 2005-18375

Communication is performed in a mobile phone system as a base station apparatus assigns a channel to terminal devices. It is possible to grasp the congestion state of the mobile phone system by monitoring the number of terminal devices being connected to the base station apparatus. In a business wireless system, a plurality of the terminal devices forms a group, and the base station apparatus assigns the channel to the group. A call within a group is mainly used in such a business wireless system, and a one-to-many call mode is set. In addition, the terminal devices in the same group are connected to each of a plurality of the base station apparatuses, and channels of the base station apparatuses, to which the terminal devices of the group are connected, are used one by one when a call is started. Thus, a case (hereinafter, referred to as a "busy") in which it is difficult to assign the channel is generated when a plurality of the groups execute calls at the same time, and call requests are generated exceeding the number of channels that can be set to the base station apparatuses. The use of channels of the base station apparatuses or the communication traffic among the base station apparatuses per call is more complex in the one-to-many communication mode than in a typical one-to-one call.

SUMMARY

In order to solve the above-described problem, a monitoring apparatus according to an aspect of an embodiment is a monitoring apparatus to monitor a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, and includes: a receiver that receives information on a busy count generated in the group registered in each of the base station apparatuses; and a processor that creates display data, which is configured to display information indicating the busy count for each of the base station apparatuses, based on the information received by the receiver.

Another aspect of the embodiment relates to a monitoring method. This method is the monitoring method of monitoring a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, and includes: receiving information on a busy count generated in the group registered in each of the base station apparatuses; and creating display data, which is configured to display information indicating the busy count for each of the base station apparatuses, based on the information received.

Incidentally, an arbitrary combination of the above-described components, and any transformation of the expression of the embodiment among a method, an apparatus, a system, a recording medium, a computer program and the like are also effective as aspects of the embodiment.

BRIEF DESCRIPTION OF THE DRAWINGS

FIGS. 4A to 4D are diagrams illustrating a data structure of information which is received by a receiver of FIG. 3;

FIG. 5 is a diagram illustrating a data structure a database which is stored in a storage of FIG. 3;

FIGS. 8A and 8B are diagrams illustrating screens which are displayed in a display unit according to Example 2;

DETAILED DESCRIPTION

The invention will now be described by reference to the preferred embodiments. This does not intend to limit the scope of the present invention, but to exemplify the invention.

Example 1

First, an overview will be described prior to describing details of the invention. Example 1 relates to a business wireless system which includes a plurality of base station apparatuses connected to a network, a plurality of terminal devices connected in the respective base station apparatuses, and a monitoring apparatus connected to the network. A group is formed of the plurality of terminal devices in the business wireless system. The base station apparatus assigns an uplink channel and a downlink channel to a group. Under such a circumstance, one terminal device (hereinafter, referred to as a "transmission device") in the group transmits a signal via the uplink channel, and another terminal device (hereinafter, referred to as a "reception device") in the group receives the signal via the downlink channel. Incidentally, a base station apparatus, which is different from the base station apparatus to which the transmission device is connected, also assign a downlink channel to the above-described group, and thus, a reception device connected to this base station apparatus can also receive the signal. Further, the same process is executed with respect to other groups, but, basically, the communication is not performed between different groups.

Since the channels are assigned for the group in the business wireless system, the use of channels of the base station apparatuses or the communication traffic among the base station apparatuses per call is hardly evaluated only based on the number of terminal devices, but is complex as described above. The monitoring apparatus included in the business wireless system according to Example 1 executes the following process in order to grasp a circumstance of communication in a case in which a call within the group is made. The monitoring apparatus acquires a busy count which is generated in each of the base station apparatuses for the group. The monitoring apparatus displays information indicating the busy count generated in each of the base station apparatuses on a map with respect to the selected group. In this manner, busy generation states of group calls in the respective base station apparatuses are collectively displayed on the map, and thus, it is easy to determine the insufficiency or sufficiency of system resources.

Figure 1:
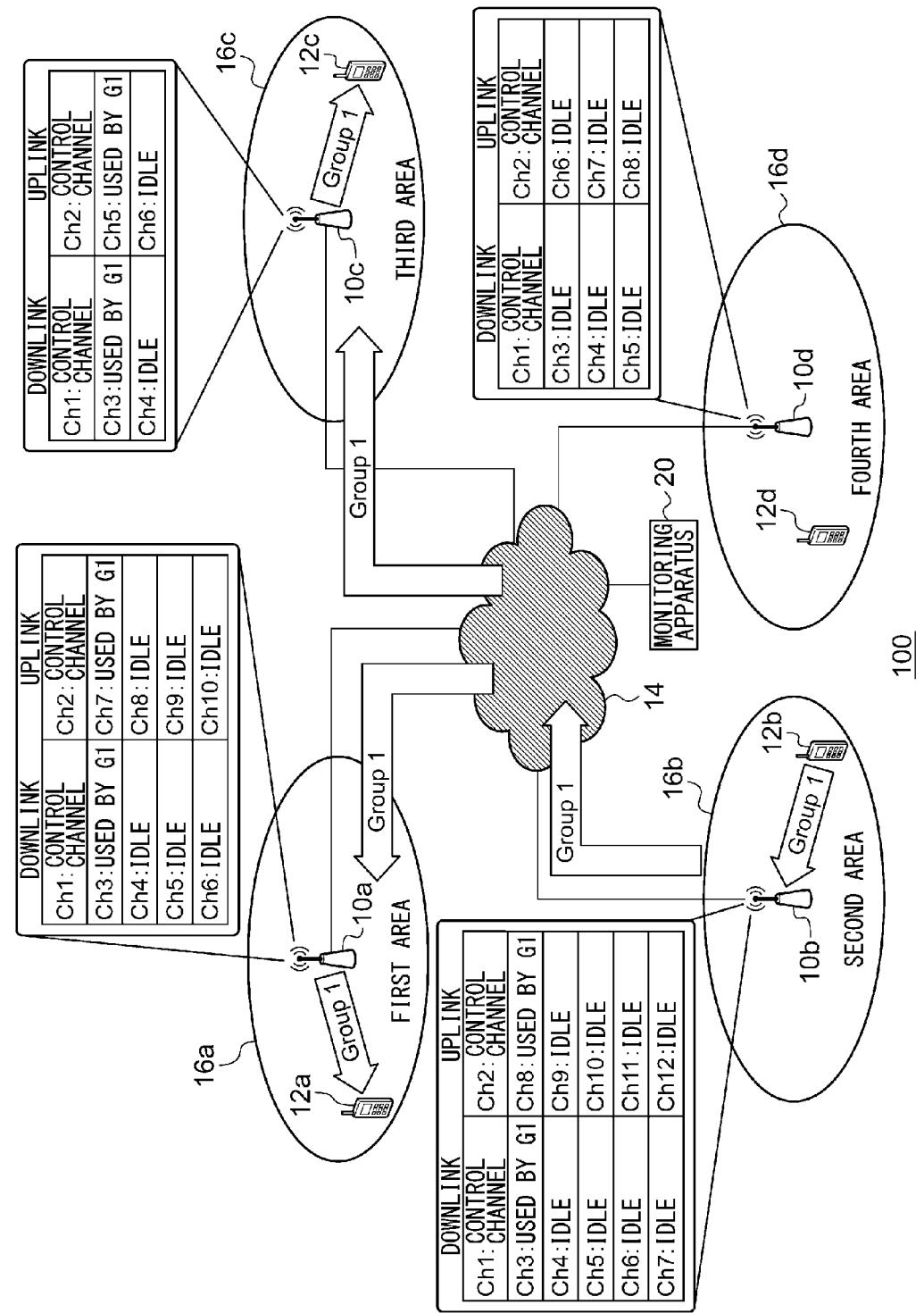
FIG. 1 is a diagram illustrating a configuration of a business wireless system according to Example 1.

FIG. 1 illustrates a configuration of a business wireless system 100 according to Example 1. The business wireless system 100 includes a first base station apparatus 10a, a second base station apparatus 10b, a third base station apparatus 10c, and a fourth base station apparatus 10d, which are collectively referred to as base station apparatuses 10, a first terminal device 12a, a second terminal device 12b, a third terminal device 12c, and a fourth terminal device 12d, which are collectively referred to as terminal devices 12, a network 14, and a monitoring apparatus 20. The first base station apparatus 10a forms a first area 16a, the second base station apparatus 10b forms a second area 16b, the third base station apparatus 10c forms a third area 16c, and the fourth base station apparatus 10d forms a fourth area 16d. Here, the first area 16a, the second area 16b, the third area 16c, and the fourth area 16d are collectively referred to as areas 16. Incidentally, the number of the base station apparatuses 10 and the number of the terminal devices 12 are not limited to "4".

The first base station apparatus 10a to the fourth base station apparatus 10d are connected to each other via the network 14. The base station apparatus 10 can set a plurality of channels, and assigns the respective channels to the groups. A known technique may be used in the channel. Here, the plurality of channels are multiplexed according to frequency division multiple access (FDMA) and frequency division duplex (FDD), for example. For example, the first base station apparatus 10a sets Ch1, and Ch3 to Ch6 as downlink channels, and sets Ch2, and Ch7 to Ch10 as uplink channels. Here, Ch1 is used as a downlink control channel, and Ch2 is used as an uplink control channel. In addition, Ch3 and Ch7 are assigned to the same group as one combination. Also, Ch4 to Ch6, and Ch8 to Ch10 are similarly configured. Similarly, the other base station apparatuses 10 also set channels, and the number of channels that can be set may be different for each of the base station apparatuses 10. Further, Ch1 and Ch2 are used, respectively, as the downlink control channel and the uplink control channel in all the base station apparatuses 10 in common.

The terminal device 12 is a wireless terminal which is capable of communicating with the other terminal devices 12 via the base station apparatuses 10. Here, a call is made as the communication. Incidentally, data communication may be performed. The terminal device 12 makes a request for registration of location with respect to the base station apparatus 10 forming the area 16 when entering the area 16. At this time, registration of the group to be used is also requested. These requests are transmitted while being included in the uplink control channel of Ch2. The uplink control channel is transmitted according to random access. The base station apparatus 10 registers the terminal device 12 for the group in response to the request.

When a call request is generated in one of the terminal devices 12, the corresponding terminal device 12 transmits the uplink control channel including an outgoing call request in Ch2. The base station apparatus 10 that has received the uplink control channel sets the corresponding terminal device 12 as the above-described transmission device, and assigns a channel to a group in which the transmission device is included. Here, the channel collectively refers to the downlink channel and the uplink channel. The base station apparatus 10 makes a request, via the network 14, to the other base station apparatus 10 to assign the channel to the corresponding group. The other base station apparatus 10 checks whether the corresponding group is registered in response to the request. When the group is registered, the other base station apparatus 10 assigns the channel to the corresponding group.

The base station apparatus 10 and the other base station apparatus 10 transmit the downlink control channels including the information on the assigned channels to the terminal devices 12. A reception device, which is the other terminal device 12 included in the corresponding group, and the transmission device recognize the assigned channels by receiving the downlink control channels. The transmission device transmits a signal to the base station apparatus 10 via the assigned uplink channel. The signal includes a digitized voice signal. The base station apparatus 10 transmits a signal to the reception device via the assigned downlink channel in a case in which the reception device is included in the group including the transmission device. In addition, the base station apparatus 10 transmits the received signal to the other base station apparatus 10. The other base station apparatus 10 transmits the signal to a reception device via the assigned downlink channel. The reception device reproduces the voice signal based on the received signal, and outputs the voice through a speaker.

In this manner, the plurality of groups in which the plurality of terminal devices 12 are included are formed. In addition, each of the plurality of base station apparatuses 10 assigns a channel for the group. As a result, the communication is performed from one of the terminal devices 12, included in a group to which the channel is assigned, to the other terminal devices 12 included in the corresponding group.

Incidentally, a transmission device and a reception device may be swapped among the plurality of terminal devices 12 included in a group. When a signal to be transmitted is generated in the terminal device 12 operating as a reception device, the corresponding terminal device 12 is switched into a transmission device by transmitting the uplink control channel including the outgoing call request as described above. In addition, the terminal device 12 operating as the transmission device is switched into the reception device when the transmission of the signal ends. In such a group call, one channel of each of the base station apparatuses 10 is used when a single call is generated. Thus, the terminal devices 12 included in the same group are registered in the base station apparatuses 10 in a wide range, the number of channels corresponding to the number of the base station apparatuses 10 is used in the single call. The above-described process is performed for each group.

FIG. 1 illustrates a circumstance in which a call within a group 1 is made. The second terminal device 12b corresponds to a transmission device. The second terminal device 12b transmits a signal using Ch8 of the second base station apparatus 10b. The group 1 is registered in the first base station apparatus 10a and the third base station apparatus 10c. Thus, the first terminal device 12a receives the signal using Ch3 of the first base station apparatus 10a, and the third terminal device 12c receives the signal using Ch3 of the third base station apparatus 10c. On the other hand, the group 1 is not registered in the fourth base station apparatus 10d, and thus, the signal from the second terminal device 12b is not output to the fourth base station apparatus 10d.

For example, in a case in which the group 1 is registered only in the second base station apparatus 10b, a transmission device receives a signal via Ch8 of the second base station apparatus 10b, and a reception device receives the signal via Ch3 of the second base station apparatus 10b when a call within the group 1 is generated. Thus, a set of channels of the single base station apparatus 10 is used. In addition, in a case in which the group 1 is registered in two of the base station apparatuses 10, a set of channels is used in each of the two base station apparatuses 10 when a call within the group 1 is generated. Thus, two sets of channels are used. This corresponds to the same consumption of channels as the one-to-one call such as a mobile phone system. Further, when the group 1 is registered in three or more of the base station apparatuses 10, three or more sets of channels are consumed. When the entire channel of the third base station apparatus 10c is used in another group, the call of the group 1 is not made in the third base station apparatus 10c. This corresponds to a missed call or a busy state.

The busy state includes a case in which channels (resources) of the base station apparatus 10 of the second terminal device 12b on an originating side are not assigned as well as a case in which channels (resources) of the base station apparatus 10 on a receiving side are not assigned as in the above-described example. In a case in which a call request is successfully made as channels of the base station apparatus 10 (for example, the second base station apparatus 10b) on the originating side are assigned, and channels of the base station apparatus 10 (for example, the third base station apparatus 10c) on the receiving side are not assigned, the group call is established excluding the corresponding base station apparatus 10 (the third base station apparatus 10c) in Example 1. That is, only the base station apparatus 10 on the receiving side is turned into the busy state. Meanwhile, it may be configured such that a call is not established at all in a case in which the channels are not assigned in one or more of the base station apparatuses 10 on the receiving side, apart from the above-described system. In such a case, the entire base station apparatus 10, which relates to the call request including the base station apparatus 10 on the originating side may be considered as being in the busy state. In Example 1, a value based on the number of times when such a busy state is generated is referred to as a "busy count" or the "number of busy".

Figure 2:
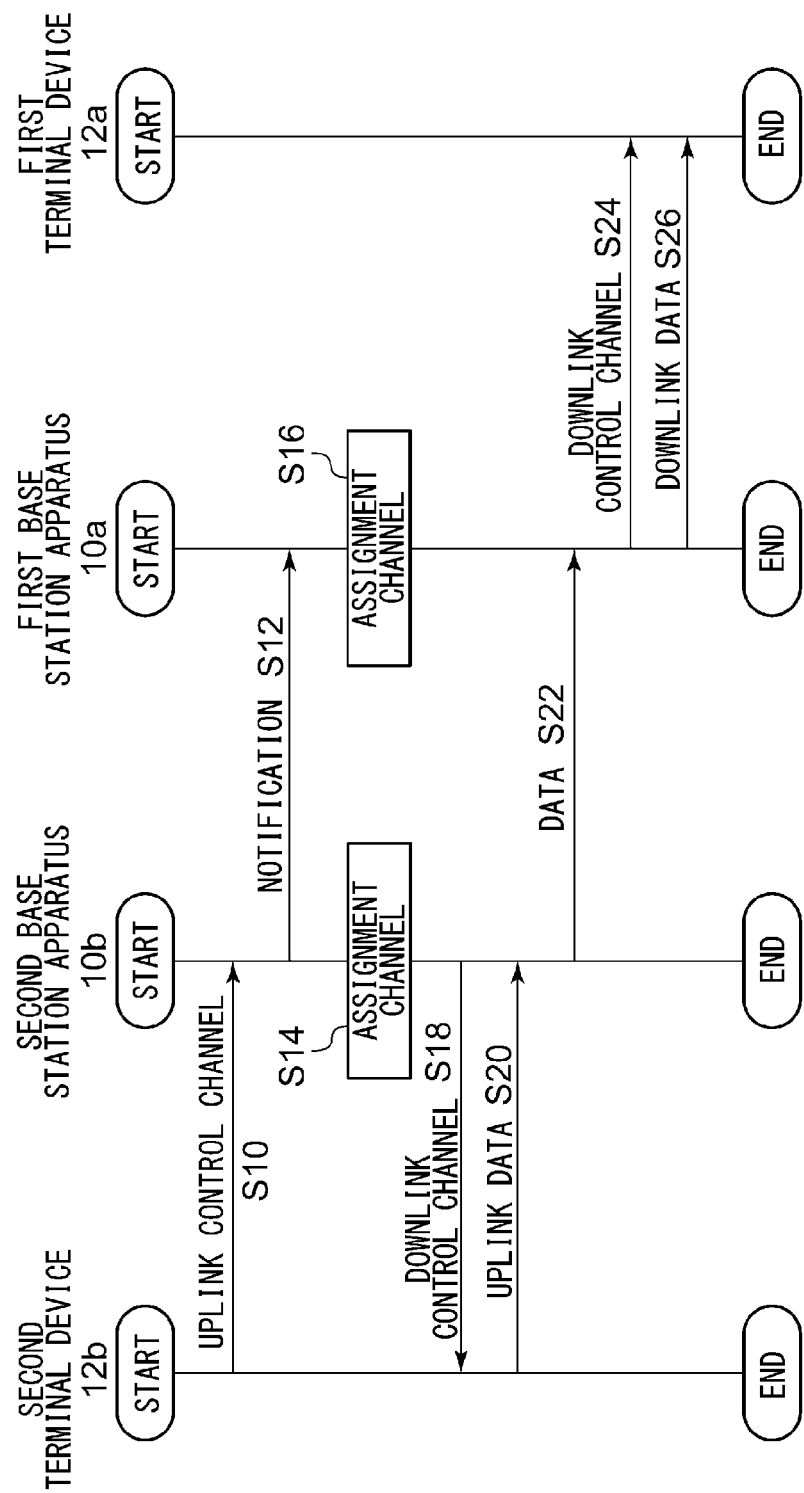
FIG. 2 is a sequence diagram illustrating a communication order according to the business wireless system of FIG. 1.

FIG. 2 is a sequence diagram illustrating a communication order according to the business wireless system 100. The second terminal device 12b transmits an outgoing call request via an uplink control channel (S10). The second base station apparatus 10b notifies the first base station apparatus 10a of the outgoing call request (S12). The second base station apparatus 10b and the first base station apparatus 10a assign the channels to the group 1 (S14 and S16). The second base station apparatus 10b transmits an assignment result via a downlink control channel (S18). The second terminal device 12b transmits uplink data to the second base station apparatus 10b (S20). The second base station apparatus 10b transmits the data to the first base station apparatus 10a (S22). The first base station apparatus 10a transmits an assignment result via a downlink control channel (S24). The first base station apparatus 10a transmits downlink data to the first terminal device 12a (S26).

Figure 3:
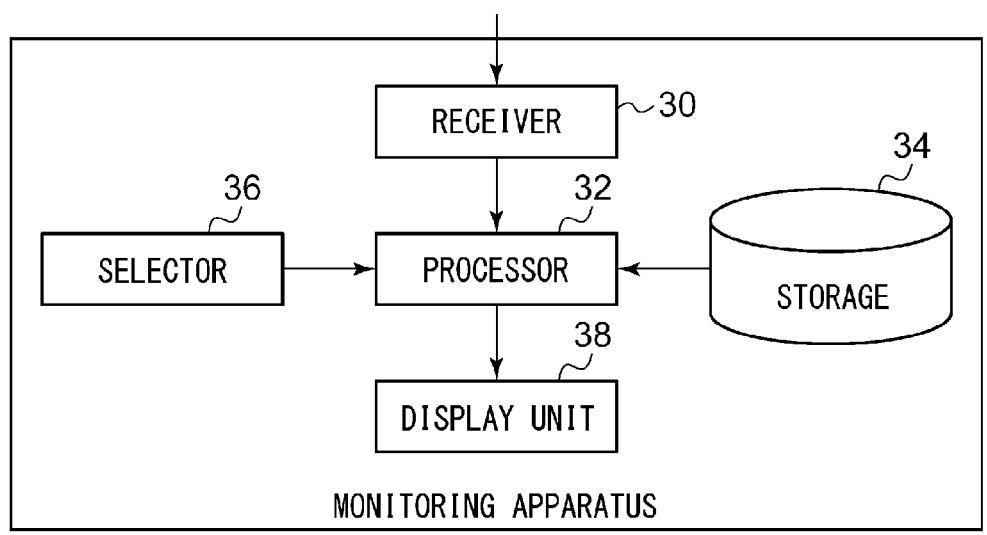
FIG. 3 is a diagram illustrating a configuration of a monitoring apparatus of FIG. 1.

FIG. 3 illustrates a configuration of the monitoring apparatus 20. The monitoring apparatus 20 includes a receiver 30, a processor 32, a storage 34, a selector 36, and a display unit 38. The receiver 30 is connected to the network 14 of FIG. 1. The receiver 30 receives each information from the plurality of base station apparatuses 10 via the network 14. The information corresponds to a busy count based on a failed call that is made by the terminal device 12 included in the group registered in the respective base station apparatuses 10. The busy count relating to the failed call made by the terminal device 12 is set such that a busy count of the base station apparatus 10 on the originating side is counted as "1" when the busy state is formed once in the base station apparatus 10 on the originating side. In addition, when the busy state is formed once in the base station apparatus 10 on the receiving side, a busy count of the base station apparatus 10 on the receiving side is counted as "1". For example, when the second terminal device 12b of the group 1 registered in the second base station apparatus 10b makes a call request, and the channel of the third base station apparatus 10c is not assigned, a busy count of the group 1 of the third base station apparatus 10c is obtained as "1". Incidentally, it may be configured such that a busy count of the base station apparatus 10 on the receiving side, turned into the busy, is counted as "1", and the number of the base station apparatuses 10 (total number of the base station apparatus 10 on the originating side and the base station apparatus 10 on the receiving side), which relates to a case in which the call request is assumed to be successful, is set as a busy count of the base station apparatus 10 on the originating side in the case of a system in which a call is not established but the busy is set when at least one of the base station apparatuses 10 on the receiving side is turned into the busy.

This is a concept that allows a loss, caused by the failure of the call, to be regarded as being great as the number of the base station apparatuses 10 relating to the call request increases, and allows the magnitude of the loss to be reflected on the busy count. For example, when the terminal devices of the group 1 are registered in the three base station apparatuses 10 including the first base station apparatus 10*a* to the third base station apparatus 10*c*, the second terminal device 12*b* of the group 1 registered in the second base station apparatus 10*b* makes a call request, the channel of the second base station apparatus 10*b* is assigned, and the channel of the third base station apparatus 10*c* is not assigned as in the example illustrated in FIG. 1, a busy count of the group 1 of the first base station apparatus 10*a* is set to "0", a busy count of the second base station apparatus 10*b* is set to "3", and a busy count of the third base station apparatus 10*c* is set to "1". At this time, the number of the base station apparatuses 10 relating to the call request may be configured to be reflected on a busy count of the base station apparatus 10 on the receiving side, which is turned into the busy state, instead of being reflected on a busy count of the base station apparatus 10 on the originating side. For example, when the second terminal device 12*b* of the group 1 registered in the second base station apparatus 10*b* makes a call request, the channel of the second base station apparatus 10*b* is assigned, and the channels of the first base station apparatus 10*a* and the third base station apparatus 10*c* are not assigned, a busy count of the group 1 of the first base station apparatus 10*a* is set to "3", a busy count of the second base station apparatus 10*b* is set to "1", and a busy count of the third base station apparatus 10*c* is set to "3". In addition, the number of the terminal devices 12, which relates to a case in which the call request is assumed to be successful, may be reflected on the busy count. For example, a value, such as a logarithmic value of the number of the relating terminal devices 12, which increases as the number of the terminal devices 12 increases may be set as the busy count of the base station apparatus 10 causing such call failure, or the base station apparatus 10 relating to the call request.

FIGS. 4A to 4D illustrate a data structure of information which is received by the receiver 30. FIG. 4A illustrates the information from the first base station apparatus 10*a*. FIG. 4A illustrates the total number of a busy count, which relates to the failed call made by the terminal device 12 included in each group, and a busy count generated in the entire registered group. FIGS. 4B to 4D are also illustrated in the same manner. Incidentally, such information may be once stored in a database (not illustrated), and then, the receiver 30 receives the information from the database instead of receiving the information from each of the base station apparatuses 10. The description will be given returning to FIG. 3.

The processor 32 outputs the information received by the receiver 30 to the storage 34. The storage 34 stores the information from the processor 32 as a database. FIG. 5 illustrates a data structure of the database which is stored in the storage 34. The storage 34 stores groups, which are registered in each of the base station apparatuses 10, and busy counts, which are generated in the respective registered groups, in time series manner. An acquisition time represents a time at which information is acquired. Incidentally, a unit of time is arbitrary, and an hour, a minute, a second, a millisecond, a microsecond or the like can be used. In Example 1, the time will be denoted like "12:30" (twelve thirty) using an hour and a minute for simplification. In addition, this acquisition time may be a so-called "acquisition date and time" including information such as an year, a month, a date, a day of the week or the like, and hereinafter, the acquisition date and time will also be denoted as the acquisition time. A group registration element represents a number of a registered group, a registered group busy generation count represents a busy count generated in a registered group between a previous acquisition date and time and a current acquisition date and time (for example, for 30 minutes). The description will be given returning to FIG. 3.

Figure 6:
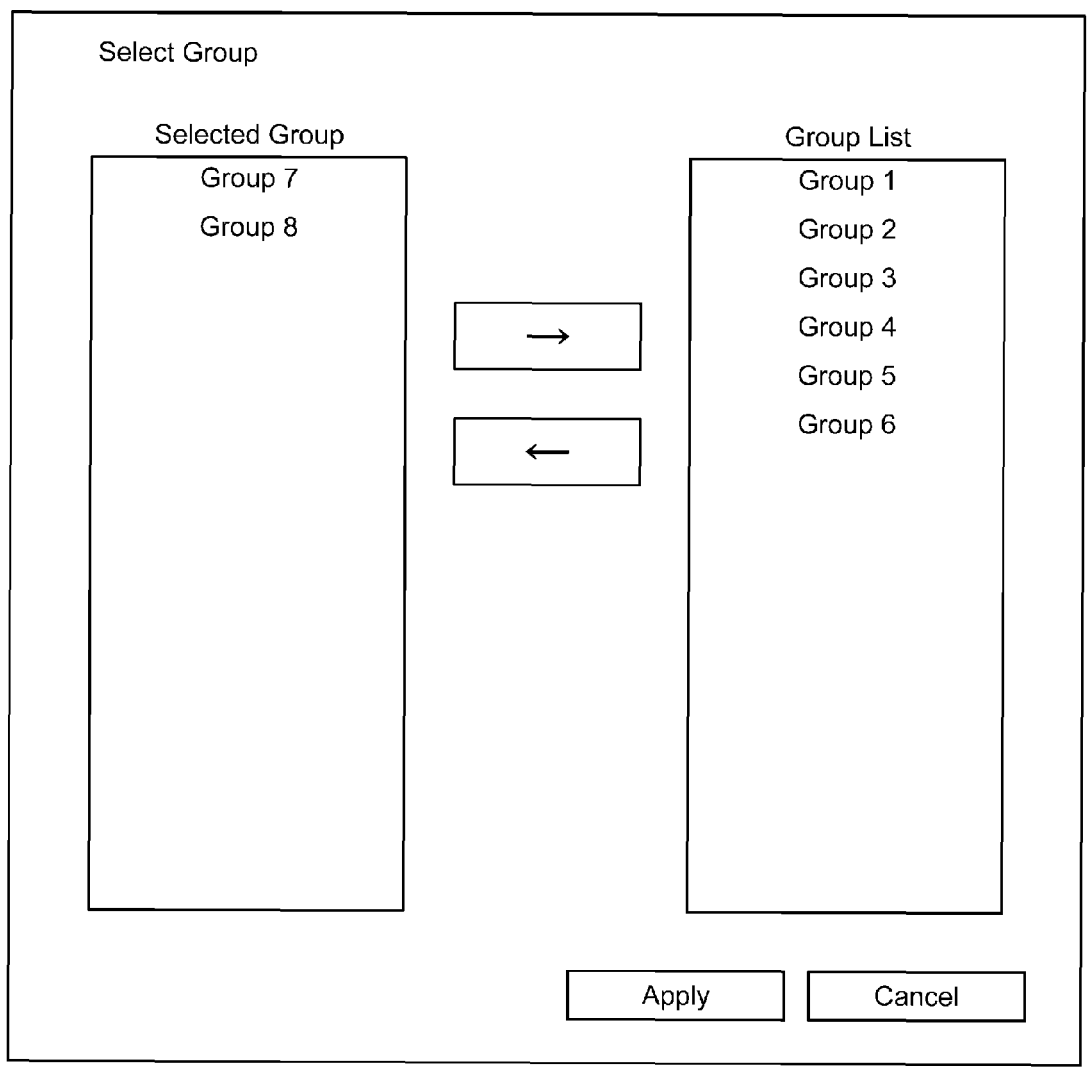
FIG. 6 is a diagram illustrating a screen for selection of a group which is displayed in a display unit of FIG. 3.

The selector 36 is an interface which is configured to allow an user to select one group as a monitoring target. The processor 32 creates display data (screen data) for selection of the group, and displays the data on the display unit 38. FIG. 6 illustrates a screen for the selection of the group which is displayed on the display unit 38. The processor 32 acquires a list of groups from the storage 34, and creates data to display the list on "Group List". The user selects a group by moving the group into "Selected Group" using an operator such as a keyboard and a mouse. Incidentally, the screen for the selection of the group may be configured using a radio button or a pull-down menu. The description will be given returning to FIG. 3. In this manner, the selector 36 selects at least one of the plurality of groups, and outputs the selected result to the processor 32. Incidentally, the plurality of groups may be selected in an arbitrarily combined manner.

The processor 32 receives the selection result from the selector 36. The processor 32 calculates a total of busy counts, which correspond to the group selected by the selector 36, from the storage 34 for each of the base station apparatuses 10. For example, a busy count of the group 1 is calculated for each of the base station apparatuses 10 when the group 1 is selected, and a total of a busy count of the group 1 and a busy count of the group 2 is calculated for each of the base station apparatuses 10 when the group 1 and the group 2 are selected. At this time, it may be configured such that only single data at a certain acquisition time is read out from the database of the storage 34, and a busy count is calculated based on the data. Alternatively, a busy count may be calculated based on data of a plurality of the acquisition times. In the case of using the data of the plurality of acquisition times, for example, the user may be allowed to designate a range of the acquisition time to be used, a predetermined number (for example, ten) of the latest data may be used, or the latest data obtained for a predetermined time (for example, past 24 hours) may be used. The specific processor 32 creates a circular graph having a radius depending on a calculated busy count for each of the base station apparatuses 10. For example, the radius of the circular graph increases as the busy count increases. The processor 32 holds a map image associated with each location of the base station apparatuses 10, and superimposes the circular graph corresponding to each of the base station apparatuses 10 on the location of the corresponding base station apparatus 10. The above-described process is performed with respect to each of the base station apparatuses 10. The processor 32 displays display data (hereinafter, will be referred to also as the "map image"), which is the map image on which the circular graph is superimposed, on the display unit 38. That is, the processor 32 creates the display data, and displays the data on the display unit 38.

Incidentally, the circular graph is used herein in order to illustrate the busy count generated in the base station apparatus 10, but it is not limited to the circular graph. For example, another graph such as a bar graph may be used. At this time, a bar is lengthened as the generated busy count increases such that the generated busy count is displayed to be recognizable to the user. In addition, another shape may be used instead of the circle, and for example, a rectangle or the like may be used. The generated busy count is displayed to be recognizable to the user also in this case. Further, only the graph may be generated without the map image, or only the generated busy count (numeral) may be illustrated, but, here, a description will be given assuming that the map image is not omitted.

Figure 7:
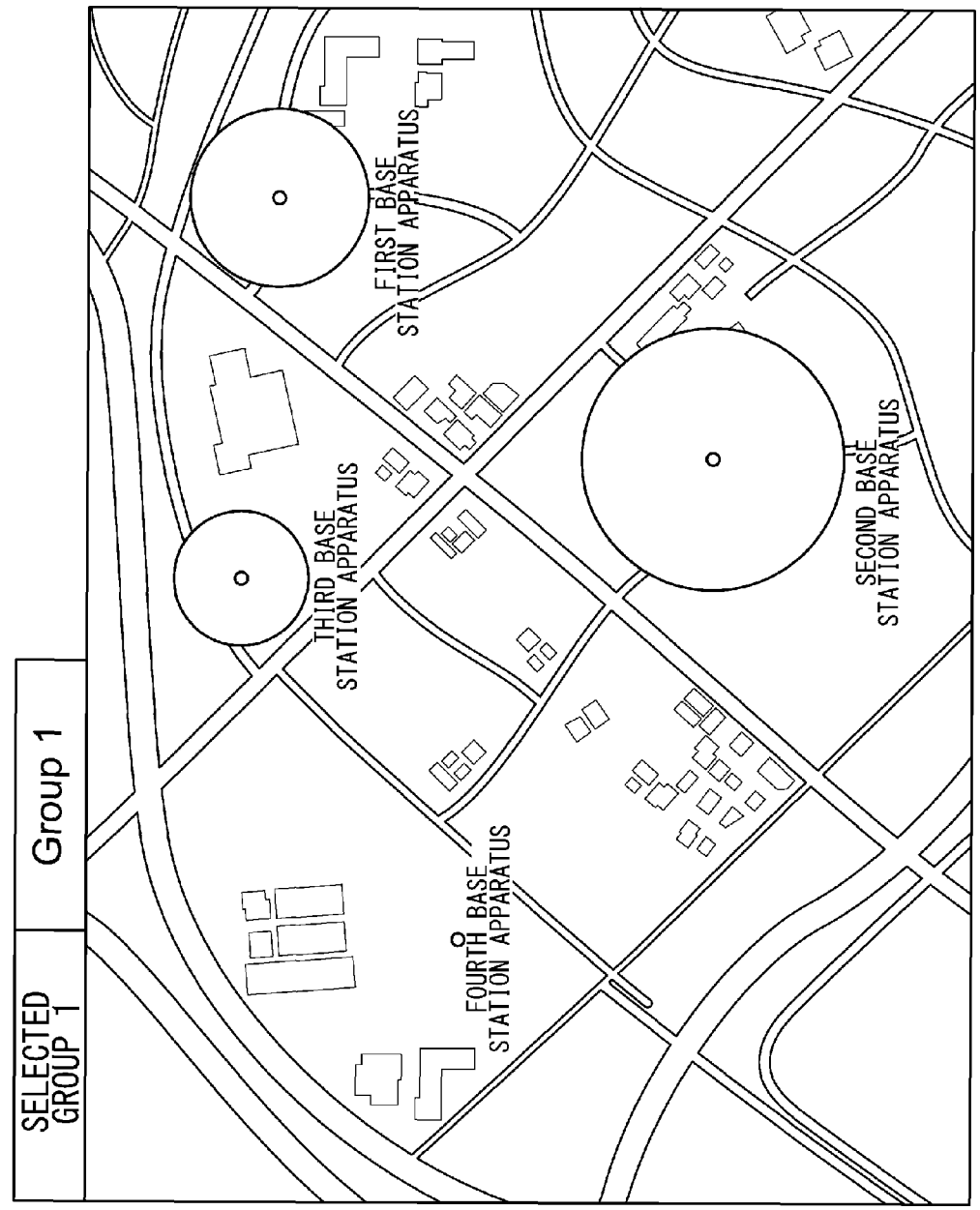
FIG. 7 is a diagram illustrating a screen which is displayed in the display unit of FIG. 3.

The display unit 38 displays the map image from the processor 32. That is, the display unit 38 displays information indicating the busy count generated in the group selected by the selector 36, as the circular graph, for each of the base station apparatuses 10. FIG. 7 illustrates a screen which is displayed in the display unit 38. Here, the group 1 is selected. As illustrated in FIG. 7, a circular graph having the busy count generated in the group 1 as a radius is displayed at each location of the base station apparatuses 10. In this manner, the display unit 38 displays information indicating the busy count, generated in at least one group based on the information received by the receiver 30, for each of the base station apparatuses 10. Incidentally, it can be configured such that the display unit 38 is not included in the monitoring apparatus 20, but a display device (not illustrated) is connected to the monitoring apparatus 20 to allow the information to be displayed on the external display device.

The configuration of the monitoring apparatus 20 can be implemented using a CPU of an arbitrary computer, a memory, or another LSI in terms of hardware, and is implemented using a program or the like which is loaded in the memory in terms of software. Here, drawn is a function block, which is implemented by cooperation thereof. Accordingly, it is understood by those skilled in the art that such a function block can be implemented in various forms using only the hardware or the software, or a combination thereof.

According to Example 1, the total of the busy counts generated in the plurality of groups is displayed for each of the base station apparatuses based on the information on the busy counts generated in the groups registered in each of the base station apparatuses, and thus, it is possible to collectively grasp the circumstances of communication of the plurality of groups. In addition, one of the plurality of groups is selected, and the busy count generated in the selected group is displayed for each of the base station apparatuses, and thus, it is possible to easily grasp the circumstance of communication in the single group. In addition, the busy count generated in the selected group is displayed for each of the base station apparatuses using the graph and the map image, and thus, it is possible to easily grasp a busy generation distribution circumstance and a busy generation area of communication among the base station apparatuses in a specific group. In addition, it is possible to know that the busy is generated a lot as the radius of the circular graph becomes large, and thus, it is possible to guess a degree of insufficiency of channel resources of the base station apparatus. Incidentally, a fee for a group call may be adjusted based on the busy count of each group which has been described in Example 1. For example, an action of reducing a usage fee may be taken targeting a group with a large busy count.

Example 2

Next, Example 2 will be described. Example 2 relates to a business wireless system including a monitoring apparatus, which is similar to Example 1. The monitoring apparatus according to Example 1 displays information indicating the busy count generated in each of the base station apparatuses with respect to the selected group using the graph. It is possible to grasp the communication circumstance at a specific time through the above-described display. In general, the communication circumstance varies as time passes. Example 2 aims to notify the user of a variation in the communication circumstance. The monitoring apparatus according to Example 2 performs display while changing the display of Example 1 in time series manner. At this time, the display is performed like animation display, for example. The business wireless system 100 and the monitoring apparatus 20 according to Example 2 are the same types as those illustrated in FIGS. 1 and 3. Here, a description will be given focusing on a difference from Example 1.

The receiver 30 sequentially receives information from each of the plurality of base station apparatuses 10 via the network 14. For example, the receiver 30 periodically receives the information. Each sequentially received information is a busy count generated in a group registered in each of the base station apparatuses 10, and further, corresponds to a busy count at a predetermined time. The processor 32 receives the selection result from the selector 36. The processor 32 extracts the busy count, generated in the group selected by the selector 36, from the storage 34 for each of the base station apparatuses 10. The processor 32 generates a map image (hereinafter, will be referred to also as the "map image") on which the circular graph is superimposed as described above. The processor 32 displays the generated map image on the display unit 38. In addition, the processor 32 repeatedly executes the above-described process while changing the acquisition time in FIG. 5. As a result, the processor 32 updates the map image along with the passage of time. The map image may update and display the information at the current date and time in real time, or may display the past information in a short period of time in the form of animation.

The display unit 38 updates the display of the map image in response to the information sequentially received by the receiver 30. FIGS. 8A and 8B illustrate screens which are displayed in the display unit 38 according to Example 2 of the invention. FIG. 8A illustrates a map image at a predetermined time (Nov. 27, 2013 12:00), and corresponds to FIG. 7. FIG. 8B illustrates a map image at a time (Nov. 27, 2013 13:00) which is later than the time of FIG. 8A. Incidentally, the display unit 38 may display only a map image at a designated time in a case in which the user designates the time or a range of time.

In addition, it may be configured as illustrated in FIGS. 8A and 8B such that a "play" button is arranged on the screen to be displayed in the display unit 38, and animation, which illustrates a change in the busy count at the past acquisition time, is played when the user presses the "play" button. In addition, each acquisition time (acquisition date and time) of data may be displayed to be superimposed on each frame (each graph) configuring the animation. It is possible to grasp the change of the busy, generated in the group registered in each of the base station apparatuses, in an extremely short period of time, as compared to the real-time display, using such a play function, and thus, the convenience of the user is improved.

In addition, the processor 32 may calculate new data through statistical processing using a plurality of data with different acquisition times (acquisition dates and times), and display the new data on the display unit 38. For example, data for 30 days, which is acquired at a time of every 30 minutes ("12:00", "12:30" and the like), is stored in the database of the storage 34. Further, an average value of 30 data at a certain time (for example, "12:00") is calculated. In this manner, the average value of the busy counts, generated in the group registered in the base station apparatus 10, which is calculated for each predetermined time within a day (24 hours) may be displayed together with the time information. It is possible to reduce the influence of an accidental event when such an average value is calculated, and thus, it is possible to display a tendency of a temporal change in the busy count accompanying the change in time with higher accuracy. In addition, a statistical value (representative value or the like) such as a median value, a mode value, a quartile value, a maximum value, or a minimum value may be calculated instead of the average value, and the graph may be created based on the value.

Further, the statistical value such as the average value may be calculated using data of the same day of the week and the same time. For example, it may be configured such that a plurality of data corresponding to "17:30 on Friday" are read out from the database of the storage 34, and a statistical value thereof is calculated and displayed. In addition, the statistical value may be calculated every elapsed time from the beginning of every month (0:00 on first), and used. For example, it may be configured such that data for 12 months is stored in the database, and a statistical value is calculated from twelve data corresponding to "12:00 on second". Incidentally, arithmetic processing may be performed considering data with slightly different acquisition times as data of the same time. In addition, when such a statistical value is calculated and displayed, the animation display is not necessarily performed. For example, a statistical value corresponding only a single time (for example, "12:00") may be calculated from a plurality of data. In such a case, only a single image to be displayed is generated, and thus, the image is displayed as a still image other than as animation.

According to Example 2, the display is updated, and thus, it is possible to easily grasp the temporal change in the busy count. In addition, the transition of distribution of the busy according to the passage of time is illustrated, and thus, it is possible to easily determine whether the insufficiency of the channel resource is temporary or steady.

Example 3

Next, Example 3 will be described. Example 3 relates to a business wireless system including a monitoring apparatus, which is similar to the above-described examples. In Example 1 and Example 2, the busy count generated in the group registered in each of the base station apparatuses is displayed using the graph with respect to the selected group. When the plurality of groups are selected, the total of the busy counts of the corresponding groups is displayed. On the other hand, Example 3 aims to notify the user of the communication circumstance of each group in the case of including the plurality of groups. The monitoring apparatus according to Example 3 displays the total number of the busy generated in the entire group, instead of the selected group, using the graph. In addition, the monitoring apparatus also displays a proportion of a busy counts of each of the groups which are set in the base station apparatus. The business wireless system 100 according to Example 3 is the same type as one illustrated in FIG. 1. Here, a description will be given focusing on a difference from the above-described configuration.

Figure 9:
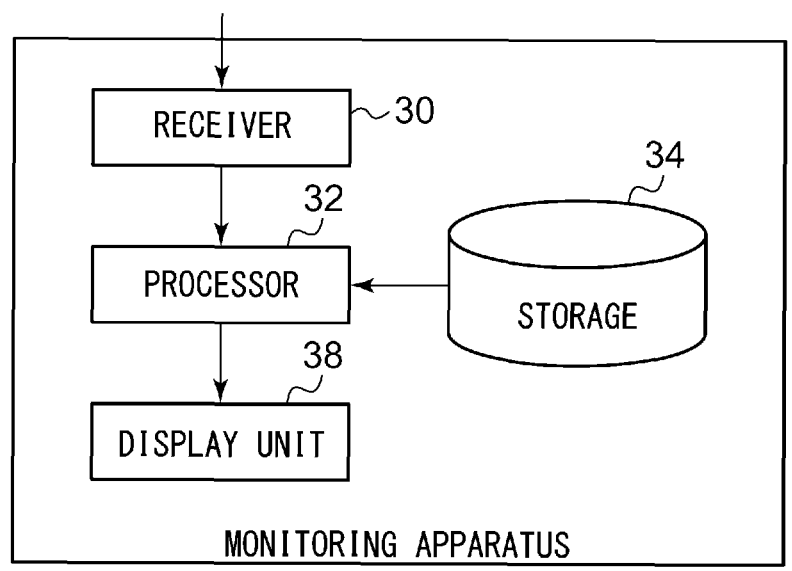
FIG. 9 is a diagram illustrating a configuration of a monitoring apparatus according to Example 3.

FIG. 9 illustrates a configuration of the monitoring apparatus 20 according to Example 3 of the invention. The monitoring apparatus 20 includes the receiver 30, the processor 32, the storage 34, and the display unit 38. The processor 32 calculates the total busy count generated in the entire group registered in the single base station apparatus 10. When FIG. 5 is exemplified, the total number of "3", "1", "0", "5", and "1", which are illustrated in "registered group busy generation count", is calculated with respect to the first base station apparatus 10a at the acquisition time "12:00". The processor 32 creates a circular graph having a radius depending on the total number. For example, the radius of the circular graph increases as the total number increases.

At this time, the circular graph is divided according to a proportion of a busy generation counts of each of the groups. For example, the circular graph is divided such that a sector having a large central angle is formed with respect to the group having a large proportion of the busy generation count. The processor 32 holds a map image associated with each location of the base station apparatuses 10, and superimposes the circular graph corresponding to each of the base station apparatuses 10 on the location of the corresponding base station apparatus 10, which is similar to the above-described examples. The above-described process is performed with respect to each of the base station apparatuses 10. The processor 32 displays the map image (hereinafter, will be referred to also as the "map image") on which the circular graph is superimposed on the display unit 38. Incidentally, the graph may be created using data of a plurality of acquisition times instead of using data of a single acquisition time. For example, it may be configured such that a total value or an average value of the busy count for each of the base station apparatuses 10 and the groups is calculated using data corresponding to one day or a predetermined number (twelve or the like) of latest acquisition date and time, and the radius of the circular graph and the respective central angles may be determined based on the calculated value.

Figure 10:
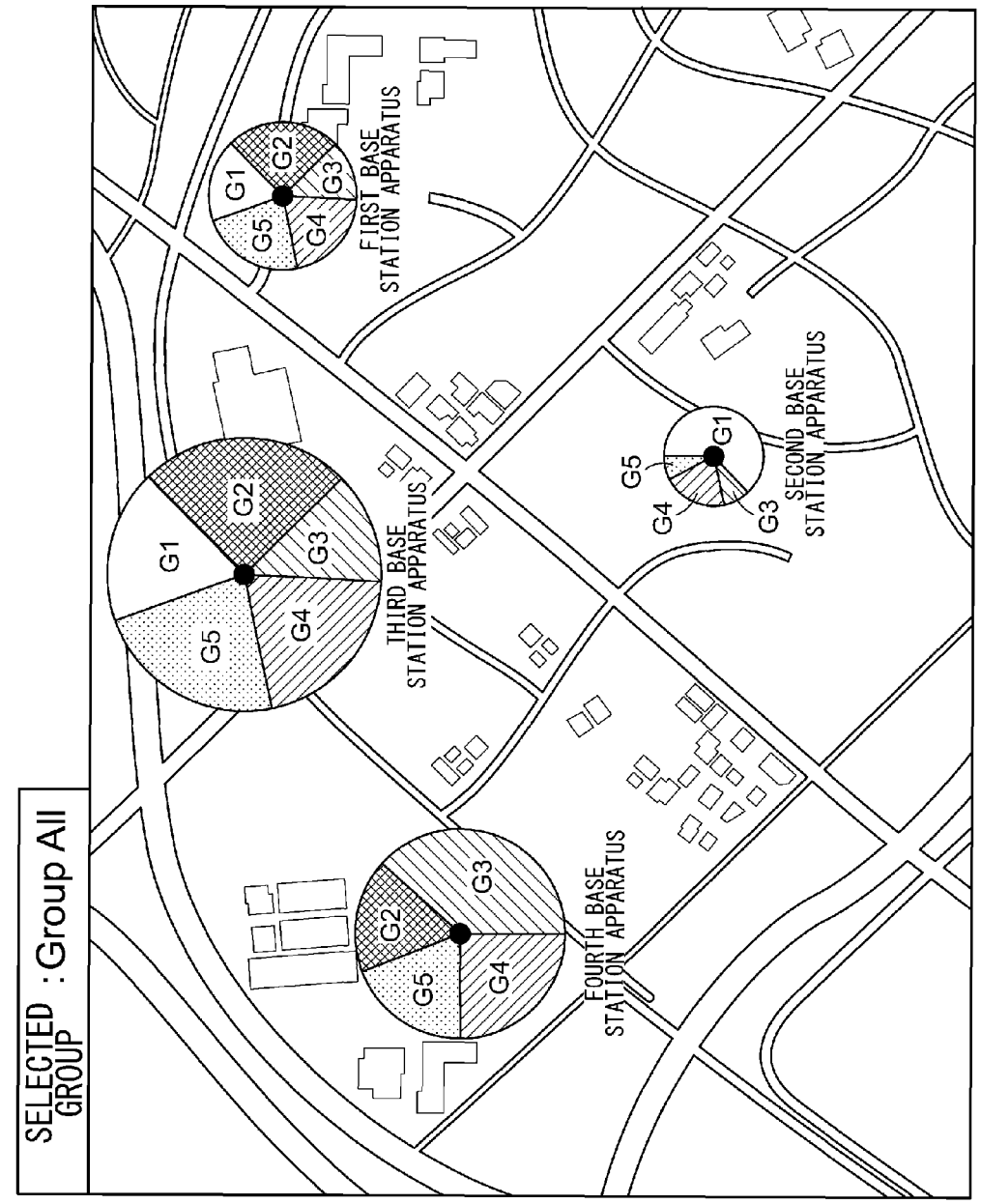
FIG. 10 is a diagram illustrating a screen which is displayed in a display unit of FIG. 9.

The display unit 38 displays the map image from the processor 32. That is, the display unit 38 displays the total busy count, generated in the groups registered in the base station apparatus 10, and the proportion of the busy counts, generated for each group set in the base station apparatus 10, for each of the base station apparatuses 10. FIG. 10 illustrates a screen which is displayed in the display unit 38. As described above, the total busy count generated in the groups registered in each of the base station apparatuses 10 is represented by a size of the radius of the circular graph. A proportion of each group occupying the total number is represented by an angle of a sector. Further, the sectors representing the respective groups may be color-coded for each group. In addition, the circular graph is not necessarily displayed at all in regard to a group which is registered in the base station apparatus 10 and in which the busy is not generated (the group with the busy count of "0"), or a name of the group is displayed in association with the circular graph.

Figure 11:
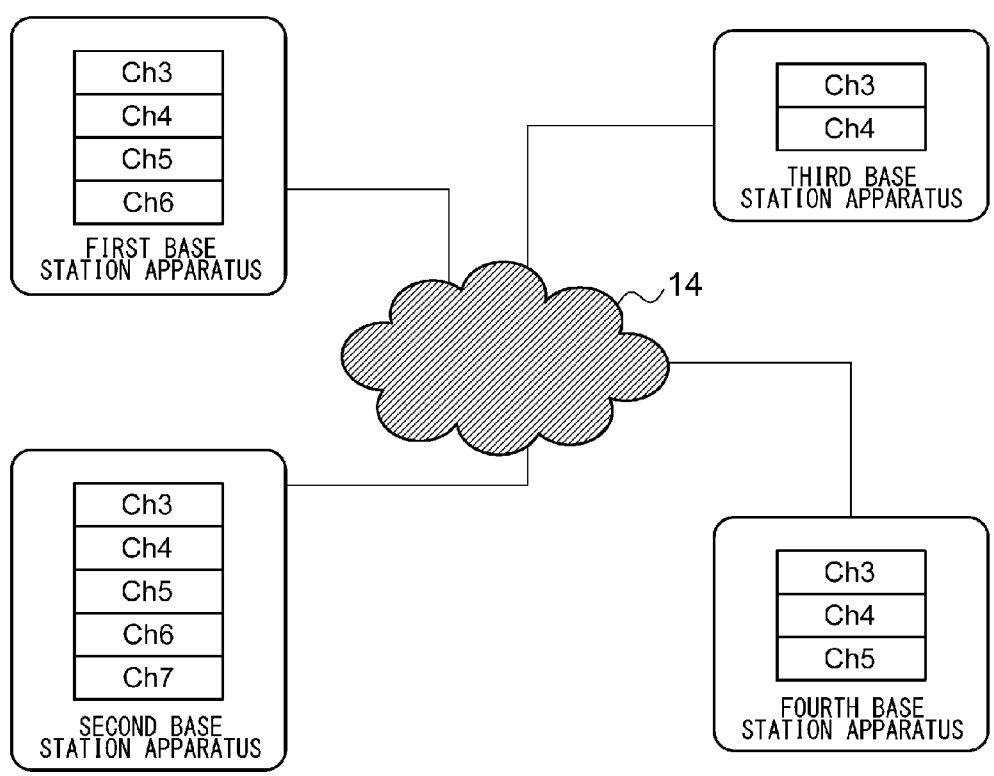
FIG. 11 is a diagram illustrating an example of a channel configuration in a business wireless system according to Example 3.
Figure 12:
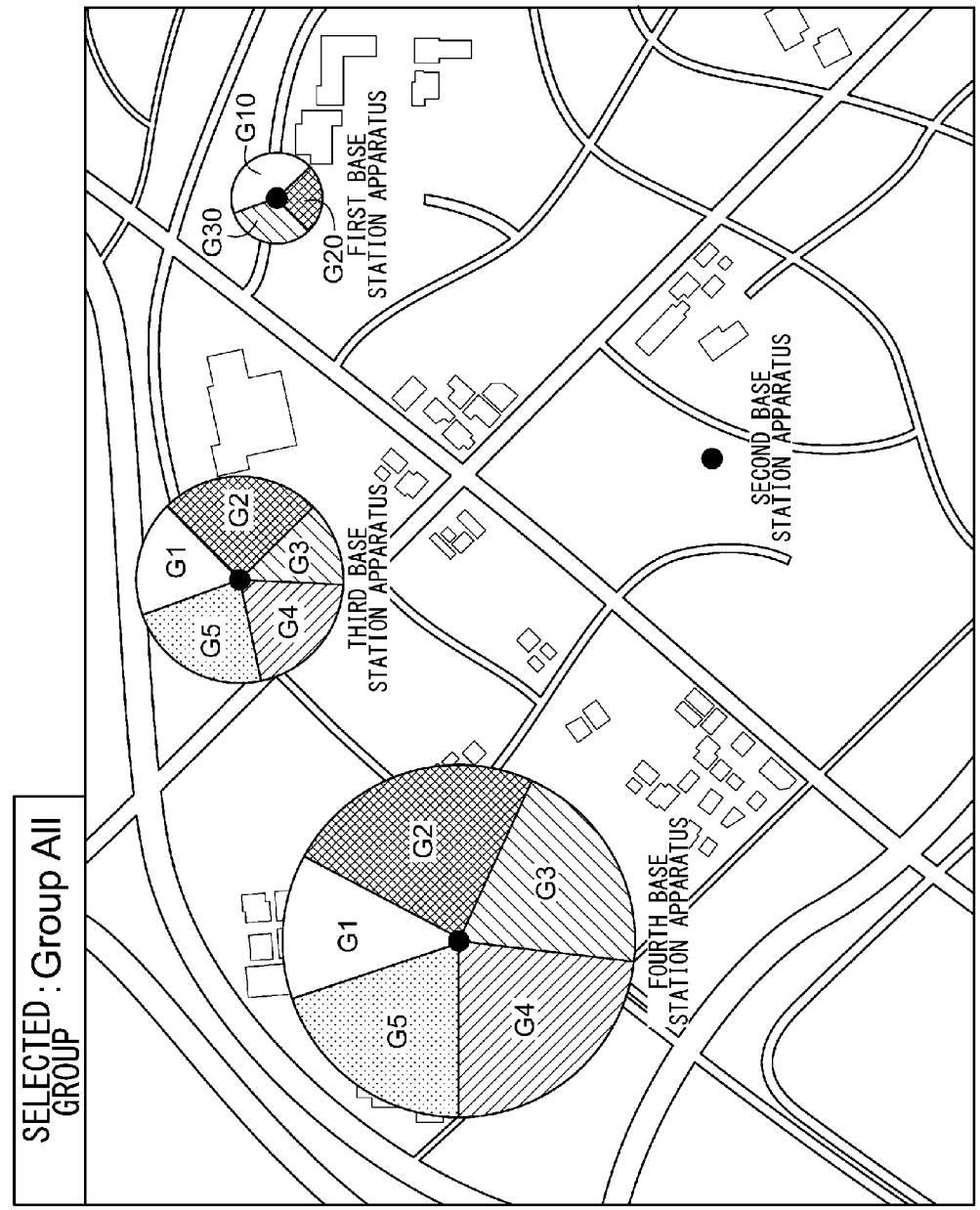
FIG. 12 is a diagram illustrating a screen which corresponds to an example of FIG. 11.

Here, Example 3 will be further described with reference to FIGS. 11 and 12. FIG. 11 illustrates an example of a channel configuration in the business wireless system 100 according to Example 3 of the invention. FIG. 11 is the same as FIG. 1, but illustrates only the downlink channel without illustrating the downlink control channel, the uplink control channel, and the uplink channel for simplification of illustration. Thus, a combination of the downlink channel and the uplink channel will be described as one channel herein. FIG. 12 illustrates a screen corresponding to an example of FIG. 11.

In this case, it is understood that the busy generated in the first base station apparatus 10a and the second base station apparatus 10b is a relatively few. Accordingly, it is possible to say the priority of reinforcement of the channel resource with respect to the first base station apparatus 10a and the second base station apparatus 10b is low.

Meanwhile, the busy in the group call is generated a lot in the third base station apparatus 10c and the fourth base station apparatus 10d. In addition, the busy is generated a lot in the same group in the third base station apparatus 10c and the fourth base station apparatus 10d. From the above configuration, it is possible to understand that a state is generated in which the group call is not established among the base station apparatuses due to the insufficiency of the channel resource, or that a state is generated in which the registered groups are too much with respect to each of the base station apparatuses. When the display of FIG. 12 is provided in this manner, it is easy for the user to determine the necessity of reinforcement of the channel resource of the base station apparatus 10, and a load circumstance caused by a bias in the distribution of the groups of the terminal device 12.

Incidentally, the information relating to the channel resource (for example, the number of channels), which has own base station, may be displayed in association with the circular graph of each base station in the screen illustrated in FIG. 12. For example, "first base station apparatus (number of channels=4)" may be displayed instead of displaying "first base station apparatus" in FIG. 12. Alternatively, the information relating to the channel resource having the base station may be displayed in a central part of the circular graph. When such display is performed, the user can more easily determine the insufficiency or sufficiency of the system resource.

In addition, the information, which relates to the total number of successful calls of the group call generated in each of the base station apparatuses 10, may be displayed instead of the information relating to the channel resource in the screen illustrated in FIG. 12. When such display is performed, it is possible to determine whether the group call is frequently performed, it is possible to guess that a call with short call duration is generated a lot to form the busy in a case in which the total number of the successful calls is large and the busy count is also large, and it is possible to guess that a call for a long period of time, which occupies the channel resource, is generated a lot in a case in which the total number of the successful calls is small but the busy count is large. Incidentally, the information including the total number of call requests including the busy count may be displayed instead of the total number of the successful calls of the group call.

In addition, the display may be performed while changing the display illustrated in FIG. 12 in time series manner, which is similar to Example 2. At this time, the display may be performed in real time, or the data of the paste acquisition time may be played at speed different from that of the real-time mode in the form of animation.

According to Example 3, the total busy count generated in the groups registered in the base station apparatus is displayed, and thus, it is possible to easily grasp a time zone on which the call requests are concentrated, and a target base station apparatus on which the call requests are concentrated. In addition, the of the generated busy count is displayed for each group set in the base station apparatus, and thus, it is possible to easily grasp which group call has a tendency of the call failure. In addition, the distribution of the busy counts of the entire group in each of the base station apparatuses is displayed, and thus, it is possible to guess the degree of insufficiency of the channel resource in the unit of the base station apparatus.

Example 4

Next, Example 4 will be described. Example 4 relates to a business wireless system including a monitoring apparatus, which is similar to the above-described examples. Example 4 aims to notify the user of any state of the busy generated in the plurality of base station apparatuses in regard to a group registered in a focused base station apparatus. As described above, the communication among the base station apparatuses in which the same group is registered is performed in the group call. Thus, a route through which the communication among the base station apparatuses is performed is recognized by recognizing how much the busy is generated in the plurality of base station apparatuses in regard to the group registered in the focused base station apparatus. A monitoring apparatus according to Example 4 displays busy counts generated in a plurality of base station apparatuses in regard to a selected group registered in the base station apparatuses. The business wireless system 100 and the monitoring apparatus 20 according to Example 4 are the same types as those illustrated in FIGS. 1 and 3. Here, a description will be given focusing on a difference from the above-described configuration.

The selector 36 selects one of the base station apparatuses 10 according to an instruction from the user. Prior to such selection, the user selects one of the base station apparatuses 10 among the plurality of base station apparatuses 10 using an operator such as a keyboard or a mouse. The selector 36 outputs the selected result to the processor 32.

The processor 32 receives the selection result from the selector 36. The processor 32 specifies a group, registered in the base station apparatus 10 selected by the selector 36, from the storage 34. When a group 3, a group 4, and a group 5 are registered in the fourth base station apparatus 10d, and the fourth base station apparatus 10d is selected, for example, the processor 32 specifies the group 3, the group 4, and the group 5. Similarly to Example 3, the processor 32 calculates the total number of busy counts of the corresponding group in the fourth base station apparatus 10d, and creates a circular graph having a radius depending on the total number. In addition, the processor 32 divides the circular graph depending on a proportion of the busy counts of each of the groups. As a result, the graph, which is the same as in Example 3 is created with respect to the selected base station apparatus 10.

In addition, the processor 32 detects the other base station apparatus 10 in which the specified group is registered by referring to the database stored in the storage 34. The number of the base station apparatuses 10 to be detected may be one or more. The processor 32 calculates the total number of busy counts corresponding to the specified group in each of the detected base station apparatuses 10, and creates a circular graph having a radius depending on the total number. In the above-described example, the total number of busy counts included in the group 3, the group 4, and the group 5 is calculated for each of the detected base station apparatuses 10. Further, the processor 32 divides the circular graph depending on a proportion of the busy counts of each of the groups.

The processor 32 holds a map image associated with each location of the base station apparatuses 10, and superimposes the circular graph corresponding to each of the base station apparatuses 10 on the location of the corresponding base station apparatus 10, which is similar to the above-described examples. The above-described process is performed with respect to each of the base station apparatuses 10. In addition, the processor 32 executes the above-described process with respect to the other base station apparatuses 10. The processor 32 displays display data (hereinafter, will be referred to also as the "map image"), which is the map image on which the circular graph is superimposed, on the display unit 38.

Figure 13:
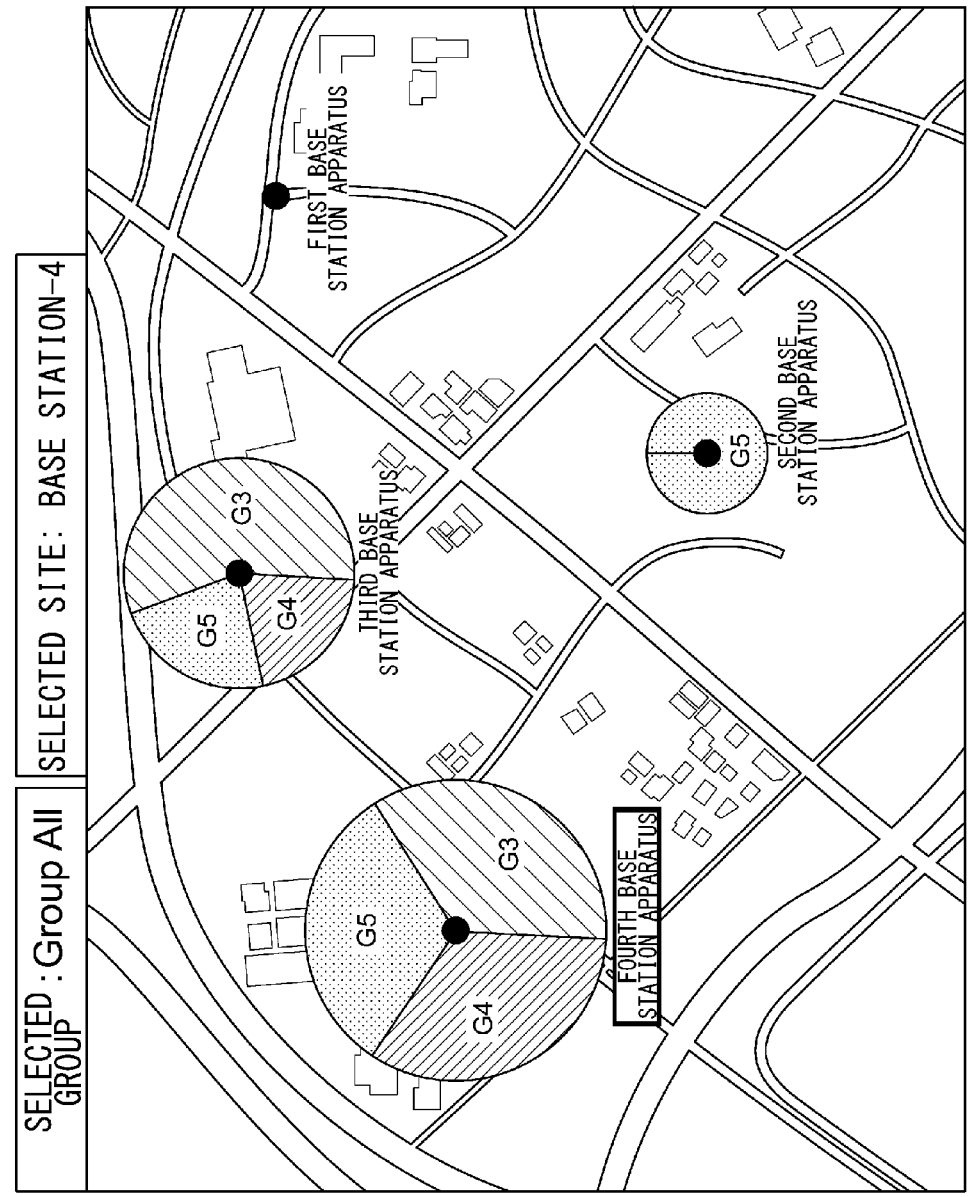
FIG. 13 is a diagram illustrating a screen which is displayed in a display unit according to Example 4.

The display unit 38 displays the map image from the processor 32. That is, the display unit 38 displays the total number of busy counts, which corresponds to the groups registered in the base station apparatus 10 selected by the selector 36, and a proportion of the busy counts of each of the groups for each of the base station apparatuses 10. FIG. 13 illustrates a screen which is displayed in the display unit 38 according to Example 4 of the invention. The fourth base station apparatus 10d is selected by the user, and the total number of busy counts corresponding to each group registered in the selected fourth base station apparatus 10d is represented by a size of the circular graph. In addition, the total number of busy counts, which corresponds to the groups registered in the fourth base station apparatus 10d among groups registered in the other neighboring base station apparatuses 10, is also represented by a size of the circular graph. At this time, when the busy of the group registered in the fourth base station apparatus 10d is not generated, the display is performed to indicate such a state.

In the example illustrated in FIG. 13, for example, the busy of the common group with the fourth base station apparatus 10d is not generated in the first base station apparatus 10a, and thus, a center point (dot) of a circular graph is displayed using a predetermined first color (for example, blue). In addition, the base station apparatus in which the common group with the fourth base station apparatus 10d is not registered is displayed to indicate such a state. For example, a center point (dot) of a circular graph is displayed using a predetermined second color (for example, black). Incidentally, a list of group number of the group registered in the fourth base station apparatus where the busy is not generated, or the like may be displayed on a map illustrating the fourth base station apparatus, and the other base station apparatuses. For example, when the group 1 (G1) and the group 2 (G2) are registered in the fourth base station apparatus 10d in addition to G3 to G5, which are illustrated, and the busy is not generated in these two groups in the example illustrated in FIG. 13, display like "no busy=G1, G2" may be displayed in the vicinity of the circular graph of the fourth base station apparatus. In addition, when the group 1 and the group 2 are registered in the first base station apparatus 10a, "no busy=G1, G2" or the like may be displayed in the vicinity of the center point of the circular graph of the first base station apparatus. Further, the sectors representing the respective groups may be color-coded for each group.

According to Example 4, the total number of busy counts, which corresponds to the selected groups registered in the base station apparatus, and a proportion of the busy counts of each of the groups are displayed for each of the base station apparatuses, and thus, it is easy to discover a problem in a group relating to the selected base station apparatus. For example, when a busy count of a group in a certain base station apparatus (a base station X) is large, and a busy count of the group, registered in another base station apparatus, in the another base station apparatus is small, it is possible to determine that resources of the base station X are insufficient.

Example 5

Next, Example 5 will be described. Example 5 corresponds to a modification example of Example 1, and relates to a business wireless system including a monitoring apparatus, which is similar to Example 1. The monitoring apparatus according to Example 1 displays information indicating the busy count generated in each of the base station apparatuses with respect to the selected group using the graph. To be specific, the radius of the circular graph is adjusted depending on the busy count. Example 5 aims to notify the user of information other than the generated busy count using a graph. The monitoring apparatus according to Example 5 derives an index, which indicates a congestion degree of a base station apparatus, and creates the graph depending on a value of the congestion degree. The business wireless system 100 and the monitoring apparatus 20 according to Example 5 are the same types as those illustrated in FIGS. 1 and 3. Here, a description will be given focusing on a difference from the above-described configuration.

The processor 32 receives the selection result from the selector 36. The processor 32 extracts a busy count generated in a group selected by the selector 36 from the storage 34 for each of the base station apparatuses 10. The processor 32 derives a ratio between the extracted busy count, and the number of channels that can be set in the base station apparatus 10 for each of the base station apparatuses 10. Here, a value (hereinafter, will be referred to as an "index 1"), which is obtained by dividing the busy count generated in the selected group by the number of channels of the base station apparatus 10, is derived as the ratio. This index 1 is used as the radius of the circular graph, and the radius increases as the index 1 increases.

For example, it is assumed that busy counts generated in a predetermined group are the same in the respective first base station apparatus 10a and second base station apparatus 10b. In addition, it is assumed that the number of channels that can be set in the first base station apparatus 10a is "10", and the number of channels that can be set in the second base station apparatus 10b is "20". Under such a circumstance, it is possible to say that the insufficiency of the channel resource is more remarkable in the first base station apparatus 10a than the second base station apparatus 10b. Since it is possible to say that the index 1 is also an index indicating the congestion degree of the base station apparatus 10, the processor 32 derives the index indicating the congestion degree of each of the base station apparatuses 10 based on the information received by the receiver 30.

Further, the processor 32 holds a map image associated with each location of the base station apparatuses 10, and superimposes the circular graph corresponding to each of the base station apparatuses 10 on the location of the corresponding base station apparatus 10, which is similar to the above-described examples. The above-described process is performed with respect to each of the base station apparatuses 10. The processor 32 displays display data (hereinafter, will be referred to also as the "map image"), which is the map image on which the circular graph is superimposed, on the display unit 38.

Figure 14:
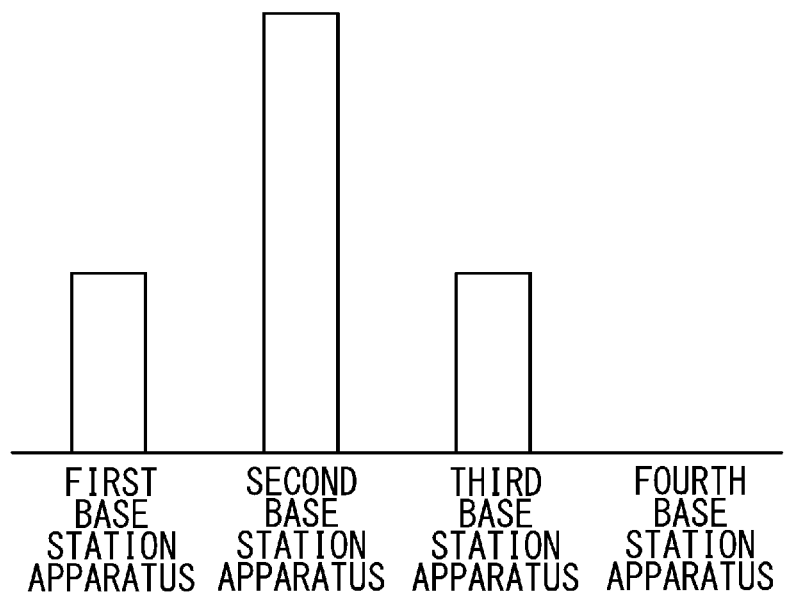
FIG. 14 is a diagram illustrating another screen which is displayed in a display unit according to Example 5.

The display unit 38 displays the map image from the processor 32. That is, the display unit 38 displays the index 1 derived by the processor 32 with respect to the group selected by the selector 36, that is, the index indicating the congestion degree for each of the base station apparatuses 10 using the circular graph. The display is performed similarly to FIG. 7. Incidentally, a graph of another form such as a bar graph may be used in order to display the index 1 without being limited to the circular graph, which is similar to the above-described examples. In addition, a numeric value of the index 1 may be directly displayed without using the graph. FIG. 14 illustrates another screen which is displayed in the display unit 38 according to Example 5 of the invention. As illustrated in FIG. 14, the index 1 with respect to each of the base station apparatuses 10 is illustrated using the bar graph. As illustrated in FIG. 14, the graph may be displayed without being superimposed on the map image.

According to Example 5, the index indicating the congestion degree of each of the base station apparatuses is derived based on the information on the busy count generated in the group registered in each of the base station apparatuses and the, derived index is displayed for each of the base station apparatuses with respect to at least one group, and thus, it is possible to grasp the base station apparatus in which the congestion degree increases. In addition, the ratio between the busy count generated in the selected group and the number of channels that can be set in the base station apparatus is derived and displayed for each of the base station apparatuses, and thus, it is possible to specify the base station apparatus in which the channel is likely to be busy. In addition, it is possible to easily grasp the necessity of equipment reinforcement of the base station apparatus by displaying the index 1.

Example 6

Next, Example 6 will be described. Example 6 corresponds to a combination of Example 5 and Example 2, and relates to a business wireless system including a monitoring apparatus, which is similar to the above-described examples. The monitoring apparatus according to Example 5 displays the index 1 indicating the congestion degree of the base station apparatus with respect to the selected group using the graph. The monitoring apparatus according to Example 6 performs display while changing the display of Example 5 in time series manner. At this time, the display is performed like animation display, for example. The business wireless system 100 and the monitoring apparatus 20 according to Example 6 are the same types as those illustrated in FIGS. 1 and 3. Here, a description will be given focusing on a difference from the above-described configuration.

The processor 32 receives the selection result from the selector 36. The processor 32 extracts the busy count, generated in the group selected by the selector 36, from the storage 34 for each of the base station apparatuses 10. As described above, the processor 32 generates a map image (hereinafter, will be referred to also as the "map image") on which the circular graph is superimposed by deriving the index 1. The processor 32 displays the generated map image on the display unit 38. In addition, the processor 32 repeatedly executes the above-described process while changing the acquisition time in FIG. 5. As a result, the processor 32 sequentially derives the index 1 in response to the information which is sequentially received by the receiver 30. The display unit 38 updates the display of the map image in accordance with the index 1 which is sequentially derived by the processor 32. Here, the display is performed similarly to FIGS. 8A and 8B. Similarly to Example 2, the map image may update and display the information at the current date and time in real time, or may display the past information in a short period of time in the form of animation. In addition, the processor 32 may store the acquisition time and the derived index 1 to be associated with each other in the database of the storage 34, and read out the index 1 of a predetermined acquisition time from the database of the storage 34 at the time of displaying the map image and the like. In addition, it may be configured such that a statistical value is calculated using a plurality of data with different acquisition times (acquisition dates and times), and the index 1 is calculated based on the statistical value, which is similar to the description in Example 2.

According to Example 6, it is possible to easily grasp a temporal change of the index 1.

Example 7

Next, Example 7 will be described. Example 7 corresponds to a modification example of Example 3, and relates to a business wireless system including a monitoring apparatus, which is similar to the above-described examples. The monitoring apparatus according to Example 3 displays the total busy count generated in the entire group using the graph, and further, displays a proportion of the busy counts of each of the groups set in the base station apparatus. Example 7 aims to notify the user of information other than the total busy count using a graph. The monitoring apparatus according to Example 7 derives an index, which indicates a congestion degree of a base station apparatus, and creates the graph depending on a value of the congestion degree. The business wireless system 100 and the monitoring apparatus 20 according to Example 7 are the same types as those illustrated in FIGS. 1 and 9. Here, a description will be given focusing on a difference from the above-described configuration.

The processor 32 derives a ratio between the busy count generated in the group registered in the single base station apparatus 10 and the number of channels that can be set in the base station apparatus 10. Here, a value (hereinafter, will be referred to as an "index 2"), which is obtained by dividing the total busy count generated in each of the base station apparatuses 10 by the number of channels of the base station apparatus 10, is derived as the ratio. This index 2 is used as the radius of the circular graph, and the radius increases as the index 2 increases. In addition, the circular graph is divided according to a proportion of the busy counts of each of the groups. Further, the processor 32 holds a map image associated with each location of the base station apparatuses 10, and superimposes the circular graph corresponding to each of the base station apparatuses 10 on the location of the corresponding base station apparatus 10, which is similar to the above-described examples. The above-described process is performed with respect to each of the base station apparatuses 10. The processor 32 displays display data (hereinafter, will be referred to also as the "map image"), which is the map image on which the circular graph is superimposed, on the display unit 38.

The display unit 38 displays the map image from the processor 32. That is, the display unit 38 displays the index 2, which is derived by the processor 32, for each of the base station apparatuses 10, and further displays a proportion of the busy counts of each of the groups set in the base station apparatus 10 for each of the base station apparatuses 10. The display is performed similarly to FIG. 10. It is possible to say that the necessity of equipment reinforcement of the base station apparatus 10 is high as the value of the index 2 increases, and the number of the group where the busy is generated increases in the base station apparatus 10. This index 2 can be also regarded as the index indicating the congestion degree of the base station apparatus 10. In addition, a graph of another form such as a bar graph may be displayed instead of the circular graph. For example, the display may be performed such that the index 2 is set as a height of the bar graph, and the bar graph is divided depending on the busy count of each group. Further, a proportion of the busy counts of each of the groups set in the base station apparatus 10 is not necessarily displayed.

According to Example 7, the ratio between the total busy count generated in the groups registered in the base station apparatus and the number of channels that can be set in the base station apparatus is derived and displayed for each of the base station apparatuses, and thus, it is possible to easily grasp the necessity of equipment reinforcement of the base station apparatus. In addition, a proportion of the busy counts of each of the groups set in the base station apparatus is displayed for each of the base station apparatuses, and thus, it is possible to specify the base station apparatus in which the call is frequently generated, and is likely to be congested.

Example 8

Next, Example 8 will be described. Example 8 corresponds to a modification example of Example 7. An index of Example 8 is different from the index 2. The business wireless system 100 and the monitoring apparatus 20 according to Example 8 are the same types as those illustrated in FIGS. 1 and 9. Here, a description will be given focusing on a difference from the above-described configuration.

The processor 32 derives a ratio between the total busy count generated in the single base station apparatus 10, and the number of the group registered in the base station apparatus 10. Here, a value (hereinafter, will be referred to as an "index 3"), which is obtained by dividing the total busy count generated in each of the base station apparatuses 10 by the number of the group registered in the base station apparatus 10, is derived as the ratio. This index 3 is set as a radius of a circular graph or a height of a bar graph. Incidentally, the circular graph or the bar graph may be divided depending on a proportion of the busy counts of each of the groups, or is not necessarily divided.

In general, there is a tendency that the busy count increases as the number of the registered groups increases, but there is also a case in which the busy count is large nevertheless the number of the group is small. Examples of such a case include a case in which the number of the group registered in a certain base station is larger than the number of channels, and further, a group has a call pattern that the number of call requests per unit time is extremely large as compared to an average group, and a case in which the call duration per one call is extremely long. It is possible to say that there is a high possibility of including the above-described particular group as the value of the index 3 of the base station apparatus 10 increases. In such a case, it is necessary to reinforce resources of such a base station, or to request the registered group to make the call pattern approximate an average pattern. For example, it is assumed that a busy count of the first base station apparatus 10a is "10", the number of the registered groups thereof is "5", a busy count of the second base station apparatus 10b is "20", and the number of the registered groups thereof is "2". In such a case, the index 3 of the first base station apparatus 10a is "2", and the index 3 of the second base station apparatus 10b is "10". It is determined that the necessity of equipment reinforcement and the necessity of the call pattern change request with respect to the group are high in the first base station apparatus 10a as compared to the second base station apparatus 10b. This index 3 can be also regarded as the index indicating the congestion degree of the base station apparatus 10.

According to Example 8, the ratio between the total busy count generated in the base station apparatus and the number of the group registered in the base station apparatus is derived and displayed for each of the base station apparatuses, and thus, it is possible to easily grasp the necessity of equipment reinforcement of the base station apparatus and the necessity of the call pattern change request with respect to the group.

Example 9

Next, Example 9 will be described. Example 9 corresponds to a modification example of Examples 7 and 8. An index of Example 9 is different from the index 2 or the index 3. The business wireless system 100 and the monitoring apparatus 20 according to Example 9 are the same types as those illustrated in FIGS. 1 and 9. Here, a description will be given focusing on a difference from the above-described configuration.

The processor 32 derives an index based on the ratio between the total busy count generated in each group registered in the base station apparatus 10 and the number of channels that can be set in the base station apparatus 10, and the ratio between the number of the group registered in the base station apparatus 10 and the number of channels that can be set in the base station apparatus 10. Here, an "index 4" is derived according to Formula 1 or Formula 2. In Formula 1 and Formula 2, the number of channels of a given base station apparatus 10 is denoted by the number of the group registered in base station apparatus 10 is denoted by "G", the busy count of a group j is denoted by "D [j]", and index 4 is denoted by Z[4]. Formula 1 is expressed as follows.

$$Z[4] = \alpha 1 \left( \frac{\sum_{j=1}^{N} D[j]}{C} \right)^{\lambda 1} + \alpha 2 \left( \frac{G}{C} \right)^{\lambda 2} \quad \text{[Formula 1]}$$

In Formula 1, α1 and α2 are constants that satisfy α1>0 and α2>0, and λ1 and λ2 are constants that satisfy λ1>0 and λ2>0. In addition, N represents the number of all groups. It is possible to say that the two terms are weight-averaged using α1 and α62 as weighting factors in Formula 1. As α2 is larger than α1, the influence of the number of the group G on the index 4 is great. In addition, it may be configured such that the exponentiation computation is not performed by setting λ1=λ2=1.

Formula 2 is expressed as follows.

$$Z[4] = \beta \left( \frac{\sum_{j=1}^{N} D[j]}{C} \right)^{\mu 1} \left( \frac{G}{C} \right)^{\mu 2} \quad \text{[Formula 2]}$$

In Formula 2, β is a constant that satisfies β>0, and μ1 and μ2 are constants that satisfy μ1>0 and μ2>0. In addition, it may be configured such that the exponentiation computation is not performed by setting μ1=μ2=1. The index 4 calculated according to Formula 1 or Formula 2 is a value that increases as the number of channels C of the base station apparatus 10 decreases, the number of the group G increases, and further, a total busy counts of the respective groups increases. It is possible to say that the necessity of equipment reinforcement of the base station apparatus 10 is high as the index 4 increases. This index 4 can be also regarded as the index indicating the congestion degree of the base station apparatus 10. A circular graph or a bar graph is displayed for each of the base station apparatuses by associating the index 4 with a radius of the circular graph or a height of the bar graph. Incidentally, the circular graph or the bar graph may be divided depending on a proportion of the busy counts of each of the groups, or is not necessarily divided.

According to Example 9, the index 4 is displayed for each of the base station apparatuses, and thus, it is possible to accurately grasp the necessity of equipment reinforcement of the base station apparatus.

As above, the invention has been described based on the examples. Those examples are illustrative, and it is understood by those skilled in the art that various types of modification examples can be made in combinations of the respective components and the respective processes, and further, such modification examples are included in a range of the invention.

Example 3 may be combined with Example 2. In this case, the display of Example 3 is updated as time passes. According to this modification example, it is possible to determine whether the degree of insufficiency of channel resources of the entire base station apparatus is temporary or steady.

Example 4 may be combined with Example 2. In this case, the display of Example 4 is updated as time passes. According to this modification example, it is possible to grasp whether the change of the busy circumstance in the plurality of base station apparatuses transitions as time passes in regard to the group registered in the selected base station apparatus. Incidentally, it may be configured such that the group registered in the selected base station apparatus is specified at a selected point in time, and a temporal change of the busy circumstance of the specified group is displayed. In addition, when a group registered in the selected base station apparatus is changed, a group to be displayed may be changed as time passes in compliance with such a change.

Any one of Examples 7 to 9 may be combined with Example 6. In this case, any display of Examples 7 to 9 is updated along with the passage of time. According to this modification example, it is possible to easily grasp a temporal change of any one of the indices 2 to 4.

It may be configured such that a×Z[i]+b is calculated using constants a and b in the indices 1 to 4 (an index Z [i] (i=1 to 4)) according to Examples 5 to 9, and the calculated result is used as a new index. In addition, it may be configured such that a value of log (Z [i]) obtained using the logarithmic function and a value of sqrt (Z [i]) obtained using the square root are calculated, and the calculated values are used as new indices. According to this modification example, it is possible to allow a numeric value of the index to fall within a range that is easily handled.

In Examples 1 to 9, the monitoring apparatus 20 is connected to the network 14. However, the monitoring apparatus 20 is not limited thereto, but may be built in any one of the base station apparatuses 10, for example. According to this modification example, it is possible to improve a degree of freedom in the configuration.

The examples may be characterized by the following items.

(Item 1-1)

A monitoring apparatus to monitor a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, the monitoring apparatus including:

a receiver that receives information on a busy count generated in the group registered in each of the base station apparatuses; and a processor that creates display data, which is configured to display information indicating the busy count for each of the base station apparatuses, based on the information received by the receiver.

(Item 1-2)

The monitoring apparatus according to the item 1-1, in which the busy count received by the receiver is the number of times of a case in which a communication request is generated from the terminal device, but the communication is not performed due to insufficiency of resources relating to the base station apparatus.

(Item 1-3)

The monitoring apparatus according to the item 1-1, in which the busy count received by the receiver is a value which is obtained, in a case in which the communication request is generated from the terminal device, but the communication is not performed due to insufficiency of resources relating to the base station apparatus, based on the number of the base station apparatuses relating to a communication request or the number of the terminal devices relating to the communication request.

(Item 1-4)

The monitoring apparatus according to the item 1-1, further including a selector that selects one among the plurality of groups, in which the processor creates display data which is configured to display information indicating the busy count, generated in the group selected by the selector, for each of the base station apparatuses.

(Item 1-5)

The monitoring apparatus according to the item 1-1, in which the processor creates display data which is configured to display a proportion of the busy counts of each of the groups registered in the base station apparatus for each of the base station apparatuses.

(Item 1-6)

The monitoring apparatus according to the item 1-1, in which the processor creates display data which is configured to display information indicating a total busy count, generated in the groups registered in the base station apparatus, a proportion of the busy counts of each of the groups registered in the base station apparatus, and the number of the group registered in the base station apparatus for each of the base station apparatuses.

(Item 1-7)

The monitoring apparatus according to the item 1-1, further including a selector that selects one of the base station apparatuses, in which the processor creates display data which is configured to display a proportion of the busy counts of each of the groups registered in the base station apparatus selected by the selector for each of the base station apparatuses.

(Item 1-8)

The monitoring apparatus according to any one of the items 1-1 to 1-7, in which the receiver sequentially receives the information on the busy count generated in the group registered in each of the base station apparatuses, and the processor updates the display data in response to the information sequentially received by the receiver.

(Item 1-9)

The monitoring apparatus according to any one of the items 1-1 to 1-8, in which the receiver sequentially receives the information on the busy count generated in the group registered in each of the base station apparatuses, and the processor calculates a statistical value relating to the busy count using a plurality of the information, which are sequentially received by the receiver, and creates display data which is configured to display information indicating the statistical value for each of the base station apparatuses.

(Item 1-10)

A monitoring method of monitoring a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, the monitoring method including:

receiving information on a busy count generated in the group registered in each of the base station apparatuses; and creating display data, which is configured to display information indicating the busy count for each of the base station apparatuses, based on the information received.

(Item 1-11)

A non-transitory computer-readable memory medium storing a computer program to monitor a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, the computer program comprising:

receiving information on a busy count generated in the group registered in each of the base station apparatuses; and creating display data, which is configured to display information indicating the busy count for each of the base station apparatuses, based on the information received.

(Item 2-1)

A monitoring apparatus to monitor a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, the monitoring apparatus including:

a receiver that receives information on a busy count generated in the group registered in each of the base station apparatuses;

a processor that derives an index indicating a congestion degree of each of the base station apparatuses based on the information received by the receiver; and a display unit that displays information indicating the index, derived by the processor, for each of the base station apparatuses.

(Item 2-2)

The monitoring apparatus according to the item 2-1, in which the busy count received by the receiver is the number of times of a case in which the communication request is generated from the terminal device, but the communication is not performed due to insufficiency of resources relating to the base station apparatus.

(Item 2-3)

The monitoring apparatus according to the item 2-1, in which the busy count received by the receiver is a value which is obtained, in a case in which the communication request is generated from the terminal device, but the communication is not performed due to insufficiency of resources relating to the base station apparatus, based on the number of the base station apparatuses relating to a communication request or the number of the terminal devices relating to the communication request.

(Item 2-4)

The monitoring apparatus according to the item 2-1, further including a selector that selects a selector that selects one among the plurality of groups, in which the processor derives a ratio between the busy count, generated in the group selected by the selector, and the number of channels settable in the base station apparatus for each of the base station apparatuses as the index, and the display unit displays information indicating the index derived by the processor for each of the base station apparatuses with respect to the group selected by the selector.

(Item 2-5)

The monitoring apparatus according to the item 2-1, in which the processor derives a ratio between the total busy count generated in the groups registered in the base station apparatus and the number of channels settable in the base station apparatus for each of the base station apparatuses as the index based on the information received by the receiver.

(Item 2-6)

The monitoring apparatus according to the item 2-1, in which the processor calculates a ratio between the total busy count generated in the groups registered in the base station apparatus and the number of channels settable in the base station apparatus, and a ratio between the number of the group registered in the base station apparatus and the number of channels settable in the base station apparatus, based on the information received by the receiver, and derives the index for each of the base station apparatuses based on the calculated two ratios.

(Item 2-7)

The monitoring apparatus according to the item 2-1, in which the processor derives a ratio between the total busy count generated in the groups registered in the base station apparatus and the number of the group registered in the base station apparatus for each of the base station apparatuses as the index based on the information received by the receiver.

(Item 2-8)

The monitoring apparatus according to any one of the items 2-5 to 2-7, in which the display unit displays a proportion of the busy counts of each of the groups set in the base station apparatus, in addition to the index derived by the processor, for each of the base station apparatuses.

(Item 2-9)

The monitoring apparatus according to any one of the items 2-1 to 2-8, in which the receiver sequentially receives the information on the busy count included in the group registered in each of the base station apparatuses, the processor sequentially derives the index in response to the information sequentially received by the receiver, and the display unit updates display in accordance with the index which is sequentially derived by the processor.

(Item 2-10)

The monitoring apparatus according to any one of the items 2-1 to 2-9, in which the receiver sequentially receives the information on the busy count included in the group registered in each of the base station apparatuses, and the processor calculates a statistical value relating to the busy count using a plurality of the information, which are sequentially received by the receiver, and derives the index based on the statistical value.

(Item 2-11)

A monitoring method of monitoring a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, the monitoring method including:

receiving information on a busy count generated in the group registered in each of the base station apparatuses;

deriving an index indicating a congestion degree of each of the base station apparatuses based on the received information; and displaying information indicating the derived index for each of the base station apparatuses.

(Item 2-12)

A non-transitory computer-readable memory medium storing a computer program to monitor a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, the computer program comprising:

receiving information on a busy count generated in the group registered in each of the base station apparatuses;

deriving an index indicating a congestion degree of each of the base station apparatuses based on the received information; and displaying information indicating the derived index for each of the base station apparatuses.

What is claimed is:

1. A monitoring apparatus to monitor a communication system in which a plurality of groups including a plurality of terminal devices are formed, and each of a plurality of base station apparatuses assigns a channel for one of the groups such that communication is performed from one of the terminal devices included in the group to which the channel is assigned to the other terminal devices included in the group, the monitoring apparatus comprising:
 a receiver that receives information on a busy count generated in each of the plurality of groups registered in each of the base station apparatuses; and a processor that creates display data, which is configured to display information indicating the busy count for each of the base station apparatuses, based on the information received by the receiver; and wherein the busy count received by the receiver is a number of times of a case in which a communication request is generated from one of the terminal devices, but the communication is not performed due to insufficiency of resources relating to one of the base station apparatuses.

2. The monitoring apparatus according to claim 1, wherein the busy count received by the receiver is a value which is obtained, in a case in which the communication request is generated from one of the terminal devices, but the communication is not performed due to insufficiency of resources relating to one of the base station apparatuses, based on a number of the base station apparatuses relating to a communication request or a number of the terminal devices relating to the communication request.

3. The monitoring apparatus according to claim 1, further comprising a selector that selects one among the plurality of groups, wherein the processor creates display data which is configured to display information indicating the busy count, generated in the group selected by the selector, for each of the base station apparatuses.

4. The monitoring apparatus according to claim 1, wherein the processor creates display data which is configured to display a proportion of the busy counts of each of the groups registered in the base station apparatus for each of the base station apparatuses.

5. The monitoring apparatus according to claim 1, further comprising a selector that selects one of the base station apparatuses, wherein the processor creates display data which is configured to display a proportion of the busy counts of each of the groups registered in the base station apparatus selected by the selector for each of the base station apparatuses.

6. A non-transitory computer-readable memory medium storing a computer program to monitor a communication system in which a plurality of groups including a plurality of terminal devices are formed, and each of a plurality of base station apparatuses assigns a channel in a unit of the group such that communication is performed from one of the terminal devices included in a group to which the channel is assigned to the other terminal devices included in the group, the computer program comprising:
 receiving information on a busy count generated in the group registered in each of the base station apparatuses; and
 creating display data, which is configured to display information indicating the busy count for each of the base station apparatuses, based on the information received; and
 wherein the busy count received by the receiver is a number of times of a case in which a communication request is generated from one of the terminal devices, but the communication is not performed due to insufficiency of resources relating to one of the base station apparatuses.

7. A monitoring apparatus to monitor a communication system in which a plurality of groups including a plurality of terminal devices are formed, and each of a plurality of base station apparatuses assigns a channel for the group such that communication is performed from one of the terminal devices included in a group to which the channel is assigned to the other terminal devices included in the group, the monitoring apparatus comprising:
 a receiver that receives information on a busy count generated in the group registered in each of the base station apparatuses;

a processor that derives an index indicating a congestion degree of each of the base station apparatuses based on the information received by the receiver;

a display unit that displays information indicating the index, derived by the processor, for each of the base station apparatuses; and wherein the busy count received by the receiver is a number of times of a case in which a communication request is generated from one of the terminal devices, but the communication is not performed due to insufficiency of resources relating to one of the base station apparatuses.

8. The monitoring apparatus according to claim 7, wherein the busy count received by the receiver is a value which is obtained, in a case in which the communication request is generated from one of the terminal devices, but the communication is not performed due to insufficiency of resources relating to one of the base station apparatuses, based on a number of the base station apparatuses relating to a communication request or a number of the terminal devices relating to the communication request.

9. The monitoring apparatus according to claim 7, further comprising:

a selector that selects one among the plurality of groups, wherein the processor derives a ratio between the busy count, generated in the group selected by the selector, and a number of channels settable in the base station apparatus for each of the base station apparatuses as the index, and the display unit displays information indicating the index derived by the processor for each of the base station apparatuses with respect to the group selected by the selector.

10. The monitoring apparatus according to claim 7, wherein the receiver sequentially receives the information on the busy count included in the group registered in each of the base station apparatuses, and the processor calculates a statistical value relating to the busy count using a plurality of the information, which are sequentially received by the receiver, and derives the index based on the statistical value.

11. The monitoring apparatus according to claim 7, wherein the receiver sequentially receives the information on the busy count included in the group registered in each of the base station apparatuses, and the processor calculates a statistical value relating to the busy count using a plurality of the information, which are sequentially received by the receiver, and derives the index based on the statistical value.

12. The monitoring apparatus according to claim 8, wherein the receiver sequentially receives the information on the busy count included in the group registered in each of the base station apparatuses, and the processor calculates a statistical value relating to the busy count using a plurality of the information, which are sequentially received by the receiver, and derives the index based on the statistical value.

13. The monitoring apparatus according to claim 9, wherein the receiver sequentially receives the information on the busy count included in the group registered in each of the base station apparatuses, and the processor calculates a statistical value relating to the busy count using a plurality of the information, which are sequentially received by the receiver, and derives the index based on the statistical value.

14. A non-transitory computer-readable memory medium storing a computer program to monitor a communication system in which a plurality of groups including a plurality of terminal devices are formed, and each of a plurality of base station apparatuses assigns a channel in a unit of the group such that communication is performed from one of the terminal devices included in a group to which the channel is assigned to the other terminal devices included in the group, the computer program comprising:

receiving information on a busy count generated in the group registered in each of the base station apparatuses;

deriving an index indicating a congestion degree of each of the base station apparatuses based on the received information; and displaying information indicating the derived index for each of the base station apparatuses; and receiving the busy count as the number of times of a case in which a communication request is generated from one of the terminal devices, but not performing the communication due to insufficiency of resources relating to one of the base station apparatuses.

* * * * *